US011608883B2

(12) United States Patent
Nakata et al.

(10) Patent No.: US 11,608,883 B2
(45) Date of Patent: Mar. 21, 2023

(54) DRIVE DEVICE

(71) Applicant: NIDEC CORPORATION, Kyoto (JP)

(72) Inventors: Keisuke Nakata, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/686,408

(22) Filed: Mar. 4, 2022

(65) Prior Publication Data

US 2022/0282781 A1 Sep. 8, 2022

(30) Foreign Application Priority Data

Mar. 8, 2021 (JP) .............................. JP2021-036150

(51) Int. Cl.
*F16H 57/04* (2010.01)
*F16H 1/22* (2006.01)
(Continued)

(52) U.S. Cl.
CPC ........... *F16H 57/0424* (2013.01); *F16H 1/22* (2013.01); *F16H 57/02* (2013.01);
(Continued)

(58) Field of Classification Search
CPC ........ F16H 57/0424; F16H 1/22; F16H 57/02; F16H 57/0471; F16H 57/0476; F16H 2057/02034; F16H 2057/02052; H02K 5/15; H02K 5/203; H02K 7/083; H02K 7/116; H02K 9/19; H02K 2207/03;
(Continued)

(56) References Cited

U.S. PATENT DOCUMENTS 7,421,928 B2 * 9/2008 Klaus ...................... F16H 57/04
475/5
7,828,095 B2 * 11/2010 Murata .................... F01M 1/02
180/65.6
(Continued)

FOREIGN PATENT DOCUMENTS

JP 2019131175 A 8/2019
WO WO 2020213646 A1 * 10/2020 ............... F16H 1/08

OTHER PUBLICATIONS

Machine Translation of WO 2020213646 A1, Fukunaga et al., Oct. 22, 2020 (Year: 2020).*

*Primary Examiner* — Vinh Luong
(74) *Attorney, Agent, or Firm* — Hauptman Ham, LLP

(57) ABSTRACT

A drive device includes a first shaft, a gear portion, a lubricant flow path, and a housing. A gear portion having a second shaft is connected to an end portion of the first shaft in the axial direction. A side plate portion of the housing separates a motor tubular portion surrounding a motor accommodation portion that accommodates a rotor and a stator and a gear tubular portion surrounding a gear accommodation portion that accommodates the gear portion. First and second bearing holding portions disposed in the side plate portion rotatably support the first and second shafts via the first and second bearings, respectively. A lubricant supply portion that is disposed radially outward of the stator and supplies lubricant to the stator includes a lubricant flow path through which lubricant can flow. The lubricant flow path is connected to at least one of the first and second bearing holding portions.

19 Claims, 13 Drawing Sheets

(51) Int. Cl.
*F16H 57/02* (2012.01)
*H02K 5/15* (2006.01)
*H02K 5/20* (2006.01)
*H02K 7/08* (2006.01)
*H02K 7/116* (2006.01)
*H02K 9/19* (2006.01)
*B60K 1/00* (2006.01)

(52) U.S. Cl.
CPC ..... *F16H 57/0471* (2013.01); *F16H 57/0476* (2013.01); *H02K 5/15* (2013.01); *H02K 5/203* (2021.01); *H02K 7/083* (2013.01); *H02K 7/116* (2013.01); *H02K 9/19* (2013.01); *B60K 2001/001* (2013.01); *F16H 2057/02034* (2013.01); *F16H 2057/02052* (2013.01); *H02K 2207/03* (2013.01)

(58) Field of Classification Search
CPC .......... H02K 1/32; H02K 5/161; H02K 7/003; B60K 2001/001; Y02T 10/64
USPC ....................................................... 74/606 R
See application file for complete search history.

(56) References Cited

U.S. PATENT DOCUMENTS

| | | | |
|---|---|---|---|
| 2020/0300353 A1* | 9/2020 | Ishikawa | B60K 1/00 |
| 2021/0129660 A1* | 5/2021 | Bradfield | F16H 57/0469 |
| 2021/0167667 A1* | 6/2021 | Ishikawa | H02K 5/203 |
| 2022/0158523 A1* | 5/2022 | Ishikawa | H02K 21/16 |
| 2022/0281310 A1* | 9/2022 | Nakata | F16H 57/0441 |
| 2022/0286016 A1* | 9/2022 | Nakata | H02K 7/116 |
| 2022/0294317 A1* | 9/2022 | Nakamura | H02K 11/33 |
| 2022/0305892 A1* | 9/2022 | Ishikawa | H02K 1/32 |

* cited by examiner

DRIVE DEVICE

CROSS-REFERENCE TO RELATED APPLICATIONS

The present invention claims priority under 35 U.S.C. § 119 to Japanese Patent Application No. 2021-036150 filed on Mar. 8, 2021, the entire content of which is incorporated herein by reference.

FIELD OF THE INVENTION

The present invention relates to a drive device.

BACKGROUND

Conventionally, there has been known a motor drive device that simultaneously performs cooling of a stator and a bearing and lubrication of the bearing by supplying oil to the stator and the bearing.

However, in the above-described device, the bearing is lubricated by injecting oil from an oil passage formed by a tubular member to the bearing. Therefore, an oil supply path for cooling the stator and lubricating the bearing becomes complicated. In addition, since the distance between the oil passage and the bearing is long, there is a possibility that the bearing cannot be sufficiently lubricated.

SUMMARY

An exemplary drive device of the present invention includes a first shaft, a rotor, a stator, a gear portion, a lubricant supply portion, and a housing. The first shaft extends along a first rotation axis extending in an axial direction and rotatable about the first rotation axis. The rotor is supported by the first shaft and is rotatable together with the first shaft. The stator is disposed radially outward of the rotor. The gear portion is connected to one axial end portion of the first shaft. The lubricant supply portion is disposed radially outward of the stator and supplies lubricant to the stator. The housing accommodates the rotor, the stator, the lubricant supply portion, and the gear portion. The gear portion includes a second shaft extending along a second rotation axis extending in the axial direction. The housing includes a motor tubular portion, a gear tubular portion, a side plate portion, a motor accommodation portion, and a gear accommodation portion. The motor tubular portion extends in the axial direction. The gear tubular portion is disposed in the axial direction with respect to the motor tubular portion and extends in the axial direction. The side plate portion expands in a direction intersecting the axial direction and separates the motor tubular portion and the gear tubular portion. The motor accommodation portion is surrounded by the motor tubular portion and the side plate portion, and accommodates the rotor and the stator. The gear accommodation portion is surrounded by the gear tubular portion and the side plate portion, and accommodates the gear portion. The side plate portion includes a first bearing holding portion and a second bearing holding portion. The first bearing holding portion rotatably supports the first shaft via a first bearing. The second bearing holding portion rotatably supports the second shaft via a second bearing. The lubricant supply portion includes a lubricant flow path through which the lubricant can flow. The lubricant flow path is connected to at least one of the first bearing holding portion and the second bearing holding portion.

The above and other elements, features, steps, characteristics and advantages of the present disclosure will become more apparent from the following detailed description of the preferred embodiments with reference to the attached drawings.

DETAILED DESCRIPTION

Figure 1:
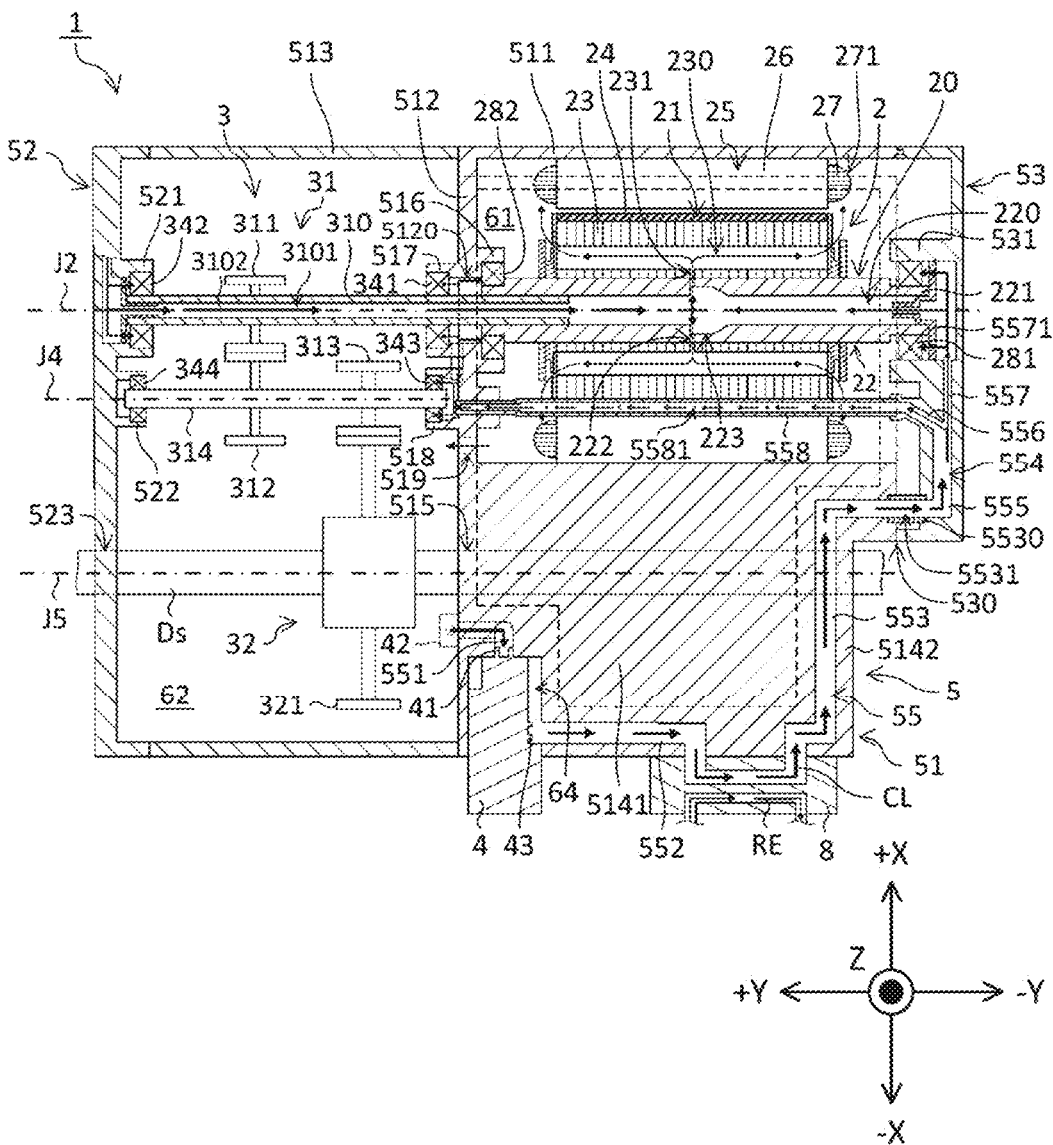
FIG. 1 is a schematic configuration view of a drive device viewed from a Z axis direction.

Hereinafter, exemplary embodiments will be described with reference to the drawings.

The following description will be made with the direction of gravity being partitioned based on a positional relationship in the case where a drive device 1 is mounted in a vehicle 200 located on a horizontal road surface. In addition, in the drawings, an XYZ coordinate system is shown appropriately as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the direction of gravity). The "Z axis direction" in the following description is an example of the "second direction" of the present invention. In each component, an end portion upward is referred to as an "upper end portion", and the position of the upper end portion in the axial direction is referred to as an "upper end". An end portion downward is referred to as a "lower end portion", and the position of the lower end portion in the axial direction is referred to as a "lower end". Among surfaces of each component, a surface facing the upper side is referred to as an "upper surface", and a surface facing the lower side is referred to as a "lower surface".

The X axis direction is a direction orthogonal to the Z axis direction and shows the front-rear direction of a vehicle 200 in which the drive device 1 is mounted. The "X axis direction" in the following description is an example of the "first direction" of the present invention. The +X direction is the front of the vehicle 200, and the −X direction is the rear of the vehicle 200. However, the +X direction can be the rear of the vehicle 200, and the −X direction can be the front of the vehicle 200.

A Y axis direction is a direction perpendicular to both the X axis direction and the Z axis direction, and indicates a width direction (i.e., a left-right direction) of the vehicle 200. The +Y direction is to the left of the vehicle 200, and the −Y direction is to the right of the vehicle 200. However, when the +X direction is the rear of the vehicle 200, the +Y direction can be the right of the vehicle 200, and the −Y direction can be the left of the vehicle 200. That is, regardless of the X axis direction, the +Y direction simply becomes one side in the right-left direction of the vehicle 200, and the −Y direction becomes the other side in the right-left direction of the vehicle 200. Depending on a method for mounting the drive device 1 on the vehicle 200, the X axis direction can be the width direction (right-left direction) of the vehicle 200, and the Y axis direction can be the front-rear direction of the vehicle 200. In the following embodiment, the Y axis direction is parallel to, for example, a rotation axis J2 of a motor portion 2. The "Y axis direction" in the following description is an example of the "axial direction" of the present invention. Further, the "+Y direction" is an example of the "one axial direction" of the present invention, and the "−Y direction" is an example of the "other axial direction" of the present invention.

Unless otherwise specified in the following description, the direction (Y axis direction) parallel to a predetermined axis such as the rotation axis J2 of the motor portion 2 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Further, in side surfaces of each component, a side surface facing the radially inner side is referred to as a "radially inner surface", and a side surface facing the radially outer side is referred to as a "radially outer surface".

In this specification, an "annular shape" includes not only a shape continuously connected without any cut along the entire circumference in the circumferential direction around the central axis but also a shape having one or more cuts in a part of the entire circumference around the central axis. Further, the "annular shape" also includes a shape having a closed curve around the central axis on a curved surface that intersects with the central axis.

In a positional relationship between any one and another of the azimuth, the line, and the surface, "parallel" includes not only a state in which the two endlessly extend without intersecting at all but also a state in which the two are substantially parallel. Further, "orthogonal" and "perpendicular" include not only a state where the two intersect each other at 90 degrees, but also a state where the two are substantially orthogonal and a state where the two are substantially perpendicular. That is, the terms "parallel", "perpendicular", and "orthogonal" each include a state in which the positional relationship between both has an angular deviation that does not depart from the gist of the present invention.

Note that these are names used merely for description, and are not intended to limit actual positional relationships, directions, names, and the like.

Figure 2:
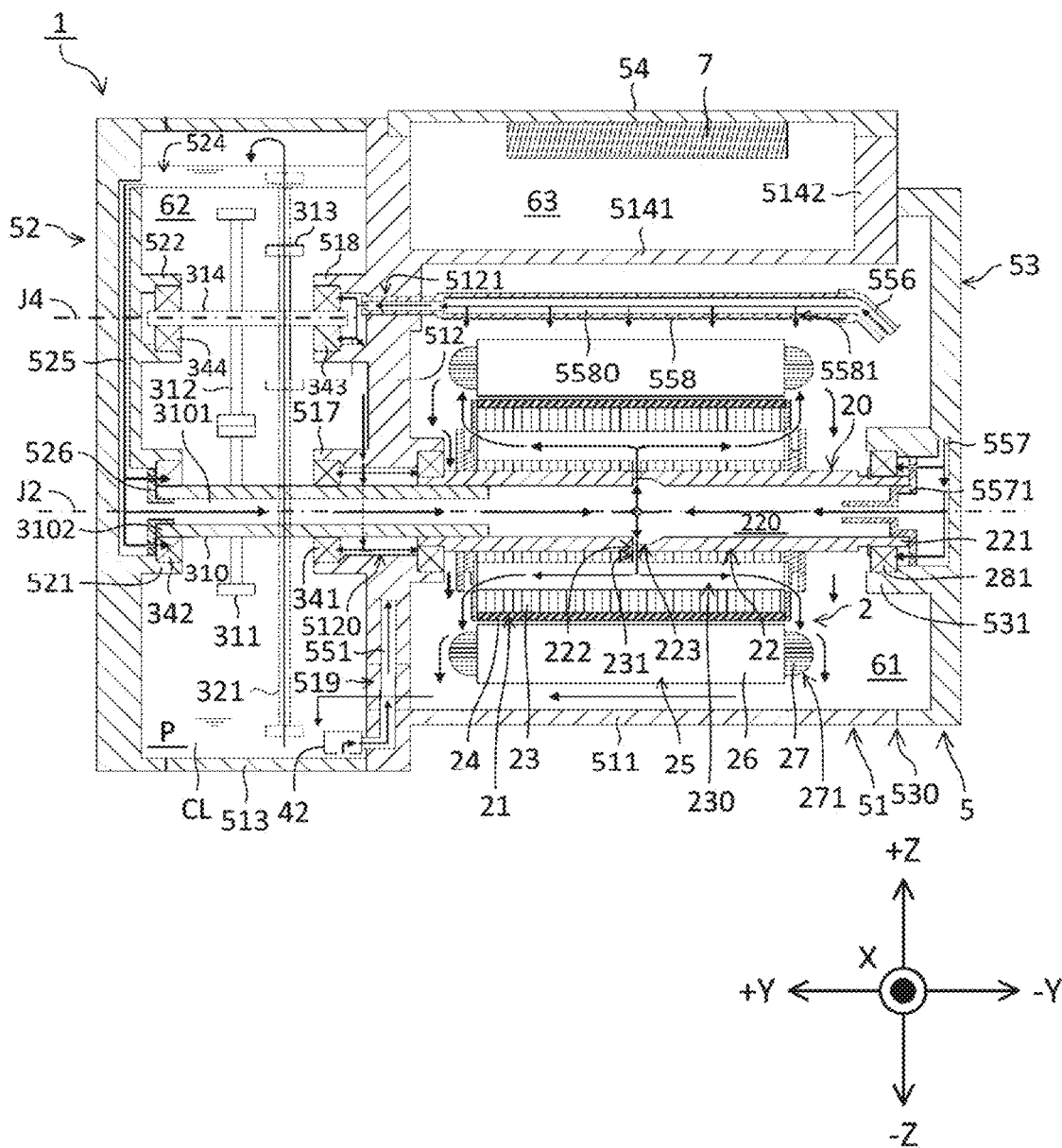
FIG. 2 is a schematic configuration view of the drive device viewed from an X axis direction.
Figure 3:
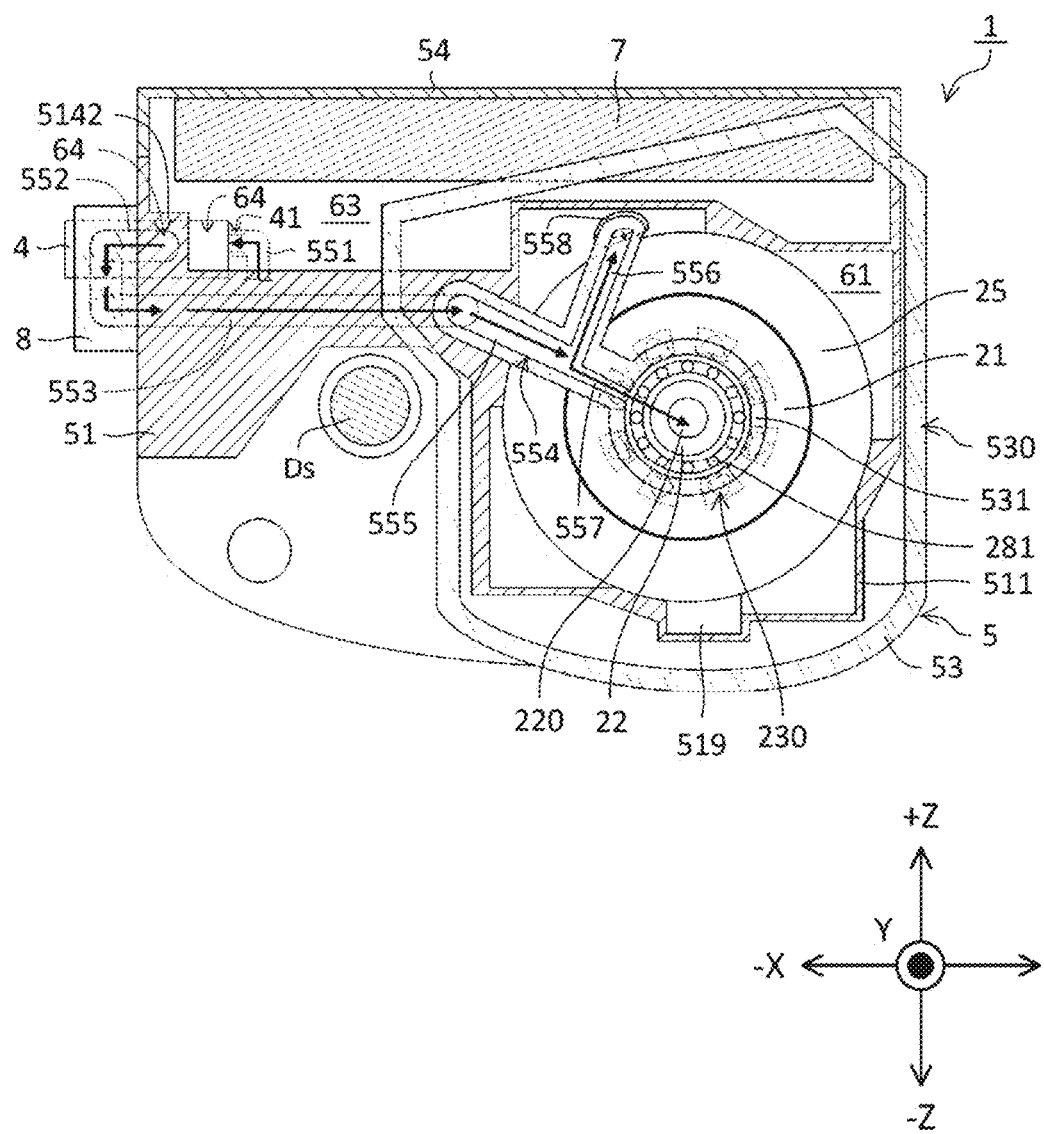
FIG. 3 is a schematic configuration view of the drive device viewed from a Y axis direction.
Figure 4:
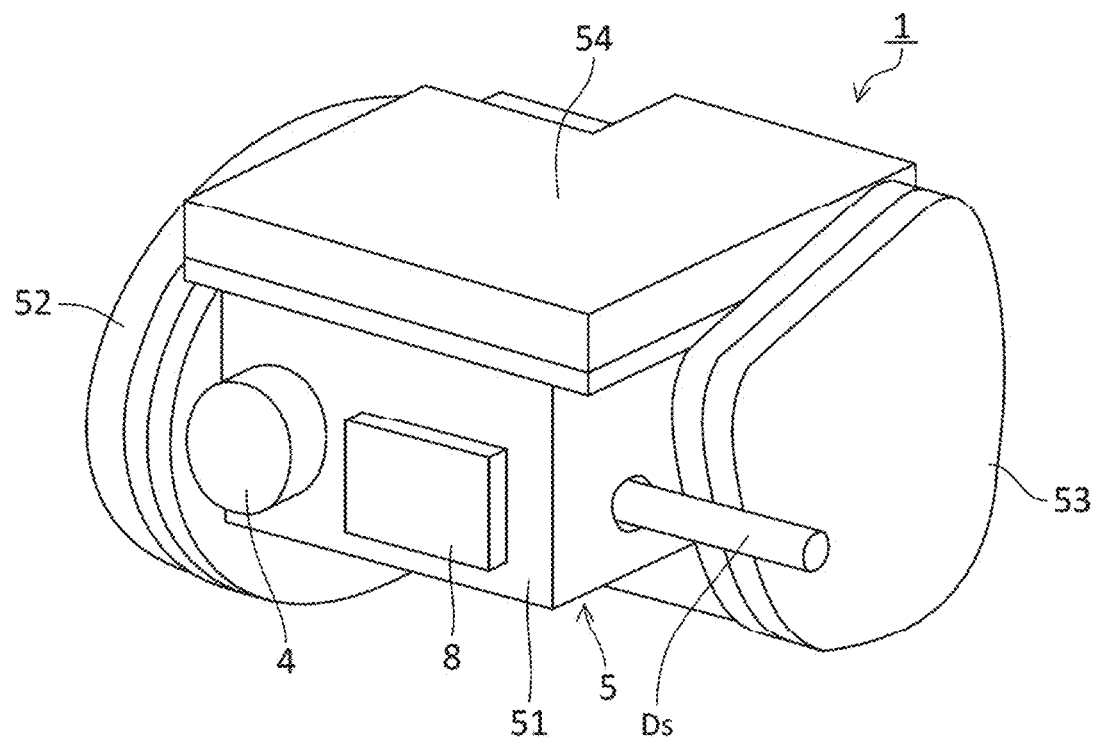
FIG. 4 is a perspective view of the drive device.
Figure 5:
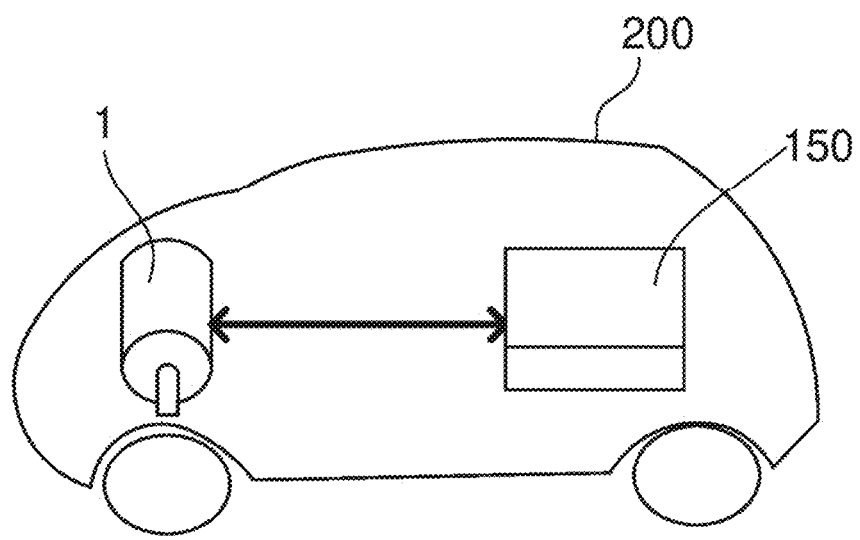
FIG. 5 is a schematic view illustrating an example of a vehicle having the drive device.

The drive device 1 according to an exemplary embodiment of the present invention will be described below with reference to the drawings. FIGS. 1 to 3 are conceptual views of the drive device 1 according to an embodiment. FIG. 1 is a schematic configuration view of the drive device 1 viewed from the Z axis direction. FIG. 2 is a schematic configuration view of the drive device 1 viewed from the X axis direction. FIG. 3 is a schematic configuration view of the drive device 1 viewed from the Y axis direction. FIG. 4 is a perspective view of the drive device 1. FIG. 5 is a schematic view illustrating an example of a vehicle 200 having the drive device 1. Note that FIGS. 1 to 5 are merely conceptual views, and the layout and dimensions of each portion are not necessarily the same as those of the actual drive device 1.

The drive device 1 is mounted on the vehicle 200 such as a hybrid vehicle (HV), a plug-in hybrid vehicle (PHV), and an electric vehicle (EV) in which at least the motor is used as a power source (see FIG. 5). The drive device 1 is used as the power source of the above-described vehicle 200. The vehicle 200 includes the drive device 1 and a battery 150. The battery 150 stores electric power to be supplied to the drive device 1. In the example of the vehicle 200, the drive device 1 drives the right and left front wheels. The drive device 1 is only required to drive at least any of the wheels.

As illustrated in FIG. 1, the drive device 1 includes a motor portion 2. The motor portion 2 includes an output shaft 20, a rotor 21, and a stator 25. In other words, the drive device 1 includes the output shaft 20, the rotor 21, and the stator 25. The output shaft 20 extends along the rotation axis J2 extending in the Y axis direction and is rotatable about the rotation axis J2. The output shaft 20 is an example of a "first shaft" of the present invention, and the rotation axis J2 is an example of a "first rotation axis" of the present invention. The rotor 21 is supported by the output shaft 20, and is rotatable together with the output shaft 20. The stator 25 is disposed radially outward of the rotor 21.

The drive device 1 further includes a gear portion 3, an oil supply portion 558, and a housing 5. The gear portion 3 is connected to the end portion of the motor shaft 22 in the +Y direction. The oil supply portion 558 is located radially outward of the stator 25 to supply the oil CL to the stator 25. The oil supply portion 558 is an example of a "lubricant supply portion" of the present invention, and the oil CL is an example of a "lubricant" of the present invention. The housing 5 accommodates the rotor 21, the stator 25, the oil supply portion 558, and the gear portion 3.

The drive device 1 further includes a pump 4 and an oil cooler 8. The pump 4 supplies an oil CL accommodated in the housing 5 to the motor portion 2. As described above, the drive device 1 includes the pump 4. The oil cooler 8 cools the oil CL. The oil cooler 8 cools the oil CL supplied from the pump 4 to the motor portion 2 in the present embodiment.

The drive device 1 further includes an inverter unit 7. The inverter unit 7 supplies drive electric power to the motor portion 2.

The inside of the housing 5 is provided with an accommodation space that accommodates the motor portion 2, the gear portion 3, the pump 4, and the inverter unit 7. As described later, this accommodation space is partitioned into a motor accommodation portion 61 that accommodates the motor portion 2, a gear accommodation portion 62 that accommodates the gear portion 3, an inverter accommodation portion 63 that accommodates the inverter unit 7, and a pump accommodation portion 64 that accommodates the pump 4. The inverter unit 7 is integrally fixed to a fourth housing member 54 described later.

The motor portion 2 is accommodated in the motor accommodation portion 61 of the housing 5. As described above, the motor portion 2 includes the output shaft 20, the rotor 21, and the stator 25.

The output shaft 20 has a tubular shape extending in the Y axis direction. The output shaft 20 includes the motor shaft 22 and a transmission shaft 310. The motor shaft 22 and the transmission shaft 310 extend along the rotation axis J2. A hollow transmission shaft 310 described later is inserted and connected to the end portion of the motor shaft 22 on the +Y direction side. In the present embodiment, the both are connected by spline fitting. Alternatively, the both may be joined by a fixing method such as welding. Details of the transmission shaft 310 will be described later.

The motor shaft 22 is rotatably supported by a first motor bearing 281 and a second motor bearing 282. The first motor bearing 281 is, for example, a ball bearing and is held by a third housing member 53 described later in the housing 5. The second motor bearing 282 is, for example, a ball bearing, and is held by a side plate portion 512 described later in the housing 5.

The motor shaft 22 is a tubular hollow shaft. The motor shaft 22 includes a hollow portion 220 and a shaft tubular portion 221 extending in the Y axis direction. The hollow portion 220 is surrounded by the inner side surface of the shaft tubular portion 221 and is connected to a third supply passage 557 described later. Specifically, the hollow portion 220 communicates with a first motor bearing holding portion 531 that accommodates the first motor bearing 281 at the end portion of the shaft tubular portion 221 on the −Y direction side, and is connected to the third supply passage 557. The hollow portion 220 communicates with a hollow portion 3101 described later of the transmission shaft 310 at an end portion of the shaft tubular portion 221 on the +Y direction side. The motor shaft 22 further includes a shaft hole portion 222. The shaft hole portion 222 penetrates the shaft tubular portion 221 in the radial direction.

When electric power is supplied from a battery (not illustrated) to the stator 25, the rotor 21 rotates about the rotation axis J2 extending in the horizontal direction. The rotor 21 further includes a rotor core 23 and a rotor magnet 24 in addition to the motor shaft 22.

The rotor core 23 is a columnar body extending along the Y axis direction. The rotor core 23 is fixed to the radial outside surface of the motor shaft 22. As mentioned earlier, the rotor 21 includes the rotor core 23. A plurality of rotor magnets 24 are fixed to the rotor core 23. The plurality of rotor magnets 24 are aligned along the circumferential direction with the magnetic poles arranged alternately.

The rotor core 23 includes a rotor through hole 230. The rotor through hole 230 penetrates the rotor core 23 in the Y axis direction and is connected to the shaft hole portion 222. The rotor through hole 230 is connected to the third supply passage 557 via the hollow portion 220. Specifically, the rotor core 23 includes a rotor communication portion 231. The rotor communication portion 231 is a space penetrating the rotor through hole 230 from the radially inner surface of the rotor core 23, and connects the rotor through hole 230 and the shaft hole portion 222. The rotor through hole 230 is used as a circulation path for the oil CL that cools the rotor 21 from inside. The oil CL circulating through the hollow portion 220 of the motor shaft 22 can flow into the rotor through hole 230 via the shaft hole portion 222 and the rotor communication portion 231 as described later. In this way, when the rotor 21 rotates, the oil CL flows out from the end portion of the rotor through hole 230 in the axis direction. This oil CL is supplied to the end portion of the stator 25 in the axis direction by centrifugal force due to the rotation of the rotor 21, and is particularly supplied to a coil end 271 described later, which is disposed at the end portion of the stator 25 in the axis direction. This oil CL can cool the end portion of the stator 25 in the axis direction, especially the coil end 271 of the stator 25.

The stator 25 surrounds the rotor 21 from the outside in the radial direction and rotationally drives the rotor 21. As described above, the stator 25 is disposed radially outward of the rotor 21. That is, the motor portion 2 is an inner rotor motor in which the rotor 21 is disposed inside the stator 25 so as to be rotatable. The stator 25 includes a stator core 26, a coil 27, and an insulator (not illustrated) arranged between the stator core 26 and the coil 27. The stator 25 is held by the housing 5. The stator core 26 includes a plurality of magnetic pole teeth (not illustrated) radially inward from an inner peripheral surface of an annular yoke.

A coil wire is wound between the magnetic pole teeth. The coil wire wound around the magnetic pole teeth constitutes the coil 27. The coil wire is connected to the inverter unit 7 via a bus bar not illustrated. The coil 27 includes a coil end 271 protruding from the axial end surface of the stator core 26. The coil end 271 protrudes in the axial direction relative to the end portion of the rotor core 23 of the rotor 21.

Next, the gear portion 3 transmits the driving force of the motor portion 2 to a drive shaft Ds that drives wheels of the vehicle 200. Details of the gear portion 3 will be described with reference to the drawings. As illustrated in FIG. 1 and the like, the gear portion 3 is accommodated in the gear accommodation portion 62 of the housing 5. The gear portion 3 includes a deceleration device 31 and a differential device 32.

The deceleration device 31 is connected to the motor shaft 22. The deceleration device 31 reduces the rotational speed of the motor portion 2, increases the torque output from the motor portion 2 according to the reduction ratio, and transmits the increased torque to the differential device 32.

The deceleration device 31 includes the transmission shaft 310, a first gear (intermediate drive gear) 311, a second gear (intermediate gear) 312, a third gear (final drive gear) 313, and an intermediate shaft 314. In other words, the gear portion 3 includes the first gear 311 fixed to the radially outer surface of the output shaft 20, and the second gear 312 and the third gear 313 fixed to the radially outer surface of the intermediate shaft 314. The gear portion 3 includes the transmission shaft 310 and the intermediate shaft 314. The torque output from the motor portion 2 is transmitted to a fourth gear 321 of the differential device 32 via the motor shaft 22, the transmission shaft 310, the first gear 311, the second gear 312, the intermediate shaft 314, and the third gear 313. The gear ratio of each gear, the number of gears, and the like can be variously changed according to the required reduction ratio. The deceleration device 31 is a parallel axis gear type deceleration device in which the axis centers of the gears are disposed in parallel. The motor shaft 22 and the transmission shaft 310 are spline-fitted.

The transmission shaft 310 extends in the Y axis direction about the rotation axis J2 and rotates about the rotation axis J2 together with the motor shaft 22. The motor shaft 22 is rotatably supported by a first gear bearing 341 and a second gear bearing 342. The first gear bearing 341 is, for example, a ball bearing, and is held by the side plate portion 512 of the housing 5 as described later. The second gear bearing 342 is, for example, a ball bearing, and is held by a second housing member 52 described later.

The transmission shaft 310 is a tubular hollow shaft. The transmission shaft 310 includes a hollow portion 3101 and a transmission shaft tubular portion 3102 of a tubular shape extending in the Y axis direction. The hollow portion 3101 is surrounded by the inner side surface of the transmission shaft tubular portion 3102, and is connected to a gear-side oil passage 525 described later at the end portion of the transmission shaft tubular portion 3102 on the +Y direction side. The −Y direction side end portion of the transmission shaft tubular portion 3102 is connected to the end portion of the motor shaft 22 on the +Y direction side. Further, the end portion of the transmission shaft tubular portion 3102 on the +Y direction side is rotatably held by a second gear bearing holding portion 521 via the second gear bearing 342.

Note that the present invention is not limited to the example of the present embodiment, and the transmission shaft 310 may be the same member as the motor shaft 22, that is, may be integrated. In other words, the motor shaft 22 may be a hollow shaft extending across the motor accommodation portion 61 and the gear accommodation portion 62 of the housing 5. In this case, the +Y direction side end portion of the motor shaft 22 protrudes on the gear accommodation portion 62 side and is rotatably supported by the second gear bearing 342. The hollow portion 220 of the motor shaft 22 communicates with the first motor bearing holding portion 531 that accommodates the first motor bearing 281 and the second gear bearing holding portion 521 that accommodates the second gear bearing 342.

The first gear 311 is provided on the outer circumferential surface of the transmission shaft 310. The first gear 311 may be the same member as or a different member from the transmission shaft 310. When the first gear 311 and the transmission shaft 310 are separate members, the first gear 311 and the transmission shaft 310 are firmly fixed by shrink fitting or the like. The first gear 311 is rotatable about the rotation axis J2 together with the transmission shaft 310.

The intermediate shaft 314 extends along the intermediate axis J4 extending in the Y axis direction. The intermediate shaft 314 is an example of a "second shaft" of the present invention, and the intermediate axis J4 is an example of a "second rotation axis" of the present invention. The gear portion 3 includes the intermediate shaft 314. The intermediate shaft 314 is rotatably supported by the housing 5 about the intermediate axis J4 parallel to the rotation axis J2. Both ends of the intermediate shaft 314 are rotatably supported by a third gear bearing 343 and a fourth gear bearing 344. The third gear bearing 343 is, for example, a ball bearing, and is held by the side plate portion 512 of the housing 5. The fourth gear bearing 344 is, for example, a ball bearing, and is held by the second housing member 52.

The second gear 312 and the third gear 313 are provided on the outer peripheral surface of the intermediate shaft 314. The second gear 312 and the third gear 313 may be the same members as or different members from the intermediate shaft 314. When the second gear 312 and the intermediate shaft 314 are separate members, they are firmly fixed by shrink fitting or the like. When the third gear 313 and the intermediate shaft 314 are separate members, they are firmly fixed by shrink fitting or the like. The third gear 313 is disposed closer to the side plate portion 512 than the second gear 312 (i.e., in the −Y direction).

The second gear 312 and the third gear 313 are connected to each other with the intermediate shaft 314 interposed therebetween. The second gear 312 and the third gear 313 are rotatable about the intermediate axis J4. The second gear 312 meshes with the first gear 311. The third gear 313 meshes with the fourth gear 321 of the differential device 32.

The intermediate axis J4 is disposed in the +Z direction with respect to the rotation axis J2 and a differential axis J5 described later (see, for example, FIG. 2). Since the intermediate axis J4 of the intermediate shaft 314 is disposed in the +Z direction with respect to both the rotation axis J2 of the output shaft 20 and the differential axis J5 of the fourth gear 321, the gap between the output shaft 20 and the fourth gear 321 can be further shortened in the X axis direction. Therefore, the gear accommodation portion 62 for accommodating the gear portion 3 can be made more compact in the X axis direction. Accordingly, the drive device 1 can be further downsized.

The torque of the transmission shaft 310 is transmitted from the first gear 311 to the second gear 312. The torque transmitted to the second gear 312 is transmitted to the third gear 313 via the intermediate shaft 314. The torque transmitted to the third gear 313 is transmitted to the fourth gear 321 of the differential device 32. In this manner, the deceleration device 31 transmits, to the differential device 32, the torque output from the motor portion 2.

The differential device 32 is attached to the drive shaft Ds. The differential device 32 transmits the output torque of the motor portion 2 to the drive shaft Ds. The drive shaft Ds is attached to each of the right and left sides of the differential device 32. The drive shaft Ds extends along the differential axis J5 extending in the Y axis direction and is rotatable about the differential axis J5. The differential device 32 has a function of transmitting the same torque to the right and left drive shafts Ds while absorbing a speed difference between the right and left wheels (drive shafts Ds) when the vehicle 200 turns, for example. The differential device 32 includes, for example, a fourth gear (ring gear) 321, a gear housing (not illustrated), a pair of pinion gears (not illustrated), a pinion shaft (not illustrated), and a pair of side gears (not illustrated).

The fourth gear 321 is rotatable about the differential axis J5 extending in the Y axis direction. Note that the differential axis J5 is an example of a "third rotation axis" of the present invention, and is parallel to the rotation axis J2. The gear portion 3 includes the fourth gear 321. Torque output from the motor portion 2 is transmitted to the fourth gear 321 via the deceleration device 31. The differential device 32 transmits the torque of the fourth gear 321 to the drive shaft Ds. Further, the lower portion (that is, a portion on the −Z direction side) of the fourth gear 321 is immersed in the lower oil pool P in the gear accommodation portion 62. For example, the oil CL is scraped up by the tooth surface of the fourth gear 321 when the fourth gear 321 of the differential device 32 rotates. A part of the oil is supplied to the inside of the gear accommodation portion 62 and is used for lubricating the gears and bearings of the speed deceleration device 31 and the differential device 32 in the gear accommodation portion 62. Further, the other part of the scraped-up oil CL is stored in a saucer portion 524 described later, and then supplied to the hollow portion 220 of the motor shaft 22 through the hollow portion 3101 of the gear-side oil passage 525 and the transmission shaft 310 described later so as to be used to cool the stator 25.

Next, the pump 4 is an electric pump driven by electricity, and is connected to the inverter unit 7 via a harness cable (not illustrated). That is, the pump 4 is driven by the inverter unit 7. As the pump 4, a trochoidal pump, a centrifugal pump, or the like can be employed. The pump 4 is provided in the pump accommodation portion 64 formed in the housing 5. For example, the pump 4 is fixed to the housing 5 with a bolt (not illustrated).

A suction port 41 of the pump 4 is inserted into a first oil passage 551 so as to close the first oil passage 551 described later. The suction port 41 of the pump 4 is connected to a strainer 42 via the first oil passage 551 described later. The strainer 42 is disposed in the gear accommodation portion 62 of the housing 5. The strainer 42 is disposed in the oil pool P (see FIG. 2 and the like) of the gear accommodation portion 62 described later. The strainer 42 sucks the oil CL by drive of the pump 4 from an inlet (not illustrated) disposed on the lower surface thereof and supplies the oil CL to the suction port 41 of the pump 4. A filtration structure (not illustrated) such as a filter is attached to the strainer 42. By attaching the filtration structure, it is possible to suppress mixing of foreign matters into the pump 4 and mixing of foreign matters into the motor portion 2.

A discharge port 43 of the pump 4 opens to the pump accommodation portion 64. That is, the oil CL protruding from the pump 4 fills the pump accommodation portion 64. A second oil passage 552 described later is connected to the pump accommodation portion 64. The pump 4 discharges the oil CL sucked from the suction port 41 from the discharge port 43 and sends the oil CL to the oil cooler 8 via the second oil passage 552.

The oil cooler 8 performs heat exchange between the oil CL sent from the pump 4 via the second oil passage 552 and a refrigerant RE supplied in a system different from a motor-side oil passage 55 described later including the second oil passage 552. Thus, the oil cooler 8 cools the oil CL to be sent from the pump 4. The oil CL cooled by the oil cooler 8 is supplied to the motor portion 2 via a third oil passage 553 and a fourth oil passage 554 described later. The refrigerant RE is supplied to the oil cooler 8 after cooling an IGBT, an SIC element, and the like (not illustrated) of the inverter unit 7.

The pump accommodation portion 64 is formed in a peripheral wall portion 5142 surrounding the inverter accommodation portion 63 (see, for example, FIG. 3). For example, the pump accommodation portion 64 can be disposed using a dead space other than the space occupied by the inverter unit 7 in the inverter accommodation portion 63. This allows the pump 4 to be compactly disposed, which can contribute to downsizing of the drive device 1.

Figure 6:
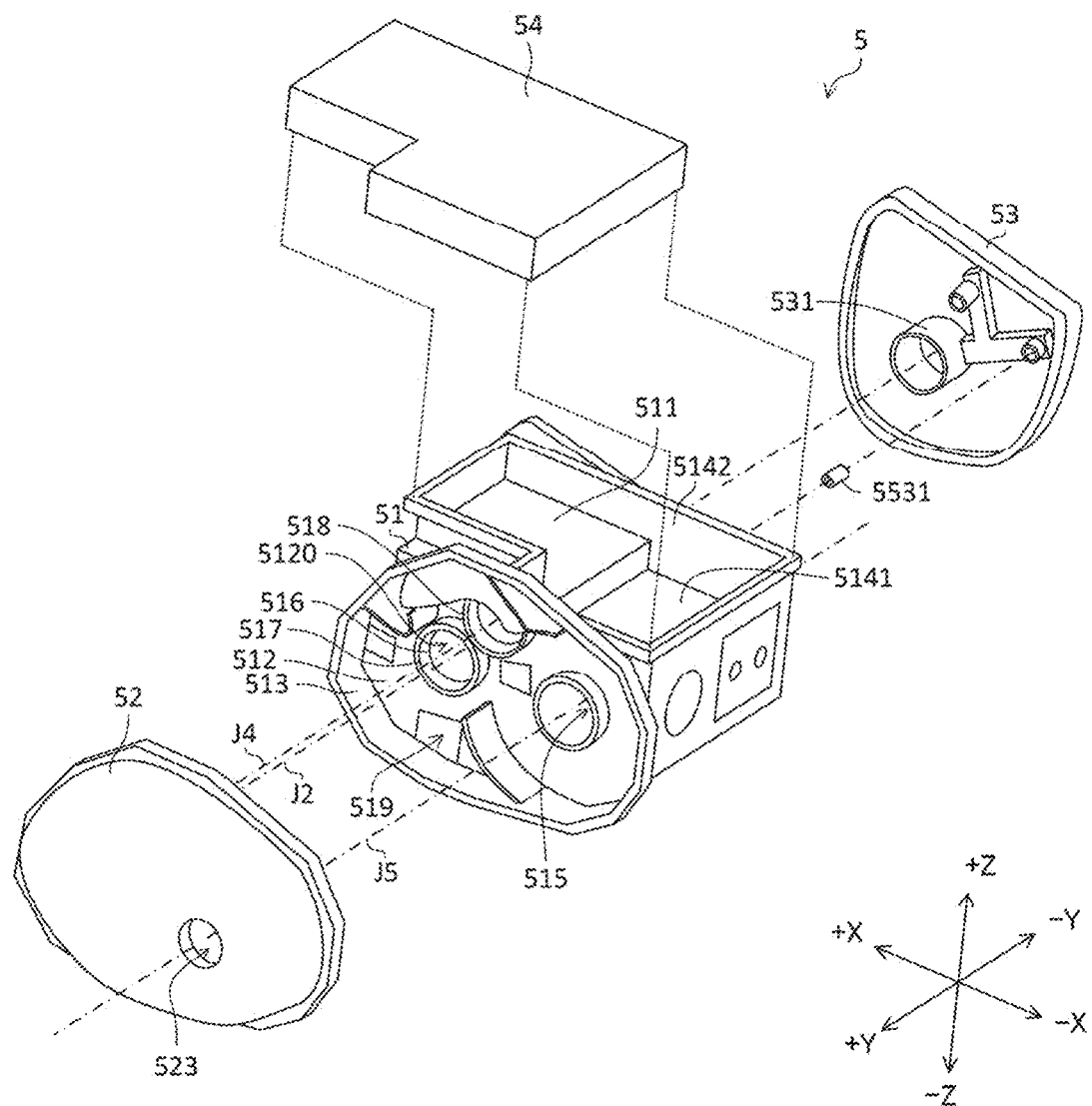
FIG. 6 is an exploded perspective view of a housing.

Next, a configuration of the housing 5 will be described with reference to FIGS. 1 to 4 and FIG. 6. FIG. 6 is an exploded view of the housing 5. As illustrated in FIG. 6, the housing 5 includes a first housing member 51, a second housing member 52, and a third housing member 53.

The first housing member 51 includes a motor tubular portion 511 of a tubular shape surrounding the stator 25, the side plate portion 512, and a gear tubular portion 513. That is, the housing 5 includes the motor tubular portion 511, the side plate portion 512, and the gear tubular portion 513. The motor tubular portion 511 extends in the Y axis direction. The gear tubular portion 513 is disposed in the +Y direction with respect to a motor tubular portion 111 and extends in the Y axis direction. The side plate portion 512 expands in a direction intersecting the Y axis direction and separates the motor tubular portion 511 and the gear tubular portion 513. The side plate portion 512 covers the end portion of the motor tubular portion 511 on the +Y direction side and covers the end portion of the motor tubular portion 511 on the −Y direction side. In the present embodiment, the motor tubular portion 511, the side plate portion 512, and the gear tubular portion 513 are integrated. However, the present invention is not limited to this example, and a part of the motor tubular portion 511, the side plate portion 512, the gear tubular portion 513 may be a member different from the other parts.

The side plate portion 512 includes a second motor bearing holding portion 516, a first gear bearing holding portion 517, and a third gear bearing holding portion 518. Note that the second motor bearing holding portion 516 and the first gear bearing holding portion 517 are examples of a "first bearing holding portion" of the present invention. The third gear bearing holding portion 518 is an example of a "second bearing holding portion" of the present invention. The second motor bearing holding portion 516 and the first gear bearing holding portion 511 rotatably support the output shaft 20 via the second motor bearing 282 and the first gear bearing 341. Note that the second motor bearing 282 and the first gear bearing 341 are examples of a "first bearing" of the present invention. Specifically, the second motor bearing holding portion 516 rotatably supports the motor shaft 22 via the second motor bearing 282. Further, the first gear bearing holding portion 517 rotatably supports the transmission shaft 310 via the first gear bearing 341. Further, the third gear bearing holding portion 518 rotatably supports the intermediate shaft 314 via the third gear bearing 343. Note that the third gear bearing 343 is an example of a "second bearing" of the present invention.

The side plate portion 512 further includes a hole 5121 (see, for example, FIG. 2). The hole 5121 penetrates the side plate portion 512 in the Y axis direction to be connected to the third gear bearing holding portion 518. Specifically, the hole 5121 is a space disposed inside the side plate portion 512, and communicates with the end surface on the +Y direction side from the end surface on the −Y direction side of the side plate portion 512. The hole 5121 extends in the Y axis direction in the present embodiment.

The second housing member 52 is attached to the end portion of the gear tubular portion 513 on the +Y direction side. The second housing member 52 closes and shuts the end portion of the gear tubular portion 513 on the +Y direction side. The second housing member 52, the side plate portion 512, and the gear tubular portion 513 constitute the gear accommodation portion 62 described later.

The third housing member 53 is attached to the end portion of the motor tubular portion 511 on the −Y direction side. The third housing member 53 closes and shuts the end portion of the motor tubular portion 511 on the −Y direction side. The third housing member 53, the motor tubular portion 511, and the side plate portion 512 constitute the motor accommodation portion 61 described later.

As illustrated in FIG. 3, a contact portion 530 in which the third housing member 53 contacts the motor tubular portion 511 is annular when viewed from the Y axis direction. The housing 5 has the continuous contact portion 530 in which the motor tubular portion 511 and the third housing member 53 are in contact with each other. The third housing member 53 includes the first motor bearing 281 that rotatably supports the shaft tubular portion 221. Further, the third housing member 53 includes the first motor bearing holding portion 531 that holds the first motor bearing 281. The first motor bearing holding portion 531 rotatably supports the end portion of the motor shaft 22 on the −Y direction side via the first motor bearing 281.

The housing 5 further includes the fourth housing member 54. The fourth housing member 54 is disposed on the +Z direction side with respect to the motor tubular portion 511. The fourth housing member 54 is attached to an upper portion of the first housing member 51.

The housing 5 further includes the motor accommodation portion 61 and the gear accommodation portion 62. The motor accommodation portion 61 is surrounded by the motor tubular portion 511 and the side plate portion 512, and accommodates the rotor 21 and the stator 25. The gear accommodation portion 62 is surrounded by the gear tubular portion 513 and the side plate portion 512, and accommodates the gear portion 3. Specifically, the motor accommodation portion 61 is a space surrounded by the motor tubular portion 511, the side plate portion 512, and the third housing member 53. The gear accommodation portion 62 is a space surrounded by the side plate portion 512, the gear tubular portion 513, and the second housing member 52. At the lower part of the gear accommodation portion 62 in the vertical direction, there is the oil pool P in which the oil CL is accumulated. The motor accommodation portion 61 and the gear accommodation portion 62 are partitioned by the side plate portion 512.

The housing 5 further includes the inverter accommodation portion 63 that accommodates the inverter unit 7. The inverter accommodation portion 63 is a space surrounded by the motor tubular portion 511, a plate portion 5141 described later, and the peripheral wall portion 5142 described later. The inverter accommodation portion 63 opens in the +Z direction. The opening is covered with the fourth housing member 54. The inverter unit 7 is integrally fixed to the fourth housing member 54. That is, the inverter unit 7 is fixed downward to the inverter accommodation portion 63 by integrally fixing the inverter unit 1 to the lower side of the fourth housing member 54. The fourth housing member 54 may be provided with an inverter cooling path (not illustrated).

Further, the housing 5 includes the pump accommodation portion 64. The pump accommodation portion 64 accommodates the pump 4. The pump accommodation portion 64 is formed in the first housing member 51. That is, the first housing member 51 further includes the pump accommodation portion 64.

Next, the first housing member 51 further includes the plate portion 5141 and the peripheral wall portion 5142. That is, the housing 5 includes the plate portion 5141 and the peripheral wall portion 5142. The plate portion 5141 expands from the motor tubular portion 511 in the X axis direction perpendicular to the Y axis direction. The peripheral wall portion 5142 surrounds the inverter accommodation portion 63 when viewed from the Z axis direction perpendicular to the Y axis direction and the X axis direction. Specifically, the plate portion 5141 extends in the −X direction from the outer surface of the motor tubular portion 511. The peripheral wall portion 5142 protrudes in the +Z direction from the upper end portion of the motor tubular portion 511 and the plate portion 5141, and surrounds the inverter accommodation portion 63 when viewed from the vertical direction (see FIG. 1).

The first housing member 51 further includes an insertion hole 5120, a first drive shaft passage hole 515, a second motor bearing holding portion 516, a first gear bearing holding portion 517, a third gear bearing holding portion 518, and a side plate opening 519.

The insertion hole 5120 and the first drive shaft passage hole 515 are disposed in the side plate portion 512 and penetrate the side plate portion 512 in the Y axis direction. The center of the insertion hole 5120 coincides with the rotation axis J2. The second motor bearing holding portion 516 is disposed on the −Y direction side of the insertion hole 5120. The first gear bearing holding portion 517 is disposed on the +Y direction side of the insertion hole 5120. The second motor bearing holding portion 516 and the first gear bearing holding portion 517 are connected through the insertion hole 5120.

The drive shaft Ds penetrates through the first drive shaft passage hole 515 in a rotatable state. A second drive shaft passage hole 523 is disposed in the second housing member 52. The second drive shaft passage hole 523 is a hole penetrating the second housing member 52 in the Y axis direction. The drive shaft Ds rotatably penetrates the second drive shaft passage hole 523. The second drive shaft passage hole 523 overlaps the first drive shaft passage hole 515 when viewed from the Y axis direction. Consequently, the drive shaft Ds disposed at both ends in the Y axis direction of the differential device 32 rotates about the differential axis J5. An oil seal (not illustrated) is provided between the drive shaft Ds and the first drive shaft passage hole 515 and between the drive shaft Ds and the second drive shaft passage hole 523 in order to suppress leakage of the oil CL. An axle (not illustrated) that rotates the wheel is connected to a front end of the drive shaft Ds.

The second motor bearing holding portion 516 extends in the −Y direction from the edge portion of the insertion hole 5120. An outer ring of the second motor bearing 282 is fixed to the second motor bearing holding portion 516. The +Y direction side end portion of the motor shaft 22 is fixed to the inner ring of the second motor bearing 282. The first motor bearing holding portion 531 is disposed on the +Y direction side of the third housing member 53. The central axes of the first motor bearing holding portion 531 and the second motor bearing holding portion 516 each coincide with the rotation axis J2. An outer ring of the first motor bearing 281 is fixed to the first motor bearing holding portion 531. The −Y direction side end portion of the motor shaft 22 is fixed to the inner ring of the first motor bearing 281. As a result, both ends of the rotor 21 in the Y axis direction of the motor portion 2 are rotatably supported by the housing 5 via the first motor bearing 281 and the second motor bearing 282.

The first gear bearing holding portion 517 extends in the +Y direction from the edge portion of the insertion hole 5120. An outer ring of the first gear bearing 341 is fixed to the first gear bearing holding portion 517. The −Y direction side end portion of the transmission shaft 310 is fixed to the inner ring of the first gear bearing 341. The second gear bearing holding portion 521 is disposed on the −Y direction side of the second housing member 52. The central axes of the second gear bearing holding portion 521 and the first gear bearing holding portion 517 coincide with the rotation axis J2. An outer ring of the second gear bearing 342 is fixed to the second gear bearing holding portion 521. The transmission shaft 310 is fixed to the inner ring of the second gear bearing 342. As a result, the transmission shaft 310 is rotatably supported by the side plate portion 512 of the housing 5 and the second housing member 52 via the first gear bearing 341 and the second gear bearing 342.

Next, the third gear bearing holding portion 518 has a tubular shape extending in the +Y direction from the side plate portion 512. The third gear bearing holding portion 518 is disposed in the −X direction and the +Z direction with respect to the first gear bearing holding portion 517. An outer ring of the third gear bearing 343 is fixed to the third gear bearing holding portion 518. The intermediate shaft 314 is fixed to the inner ring of the third gear bearing 343. A fourth gear bearing holding portion 522 is disposed on the −Y direction side of the second housing member 52. The fourth gear bearing holding portion 522 has a tubular shape extending in the −Y direction from the second housing member 52. The central axes of the third gear bearing holding portion 518 and the fourth gear bearing holding portion 522 coincide with the intermediate axis J4. An outer ring of the fourth gear bearing 344 is fixed to the fourth gear bearing holding portion 522. The +Y direction side end portion of the intermediate shaft 314 is fixed to the inner ring of the fourth gear bearing 344. As a result, the intermediate shaft 314 is rotatably supported by the side plate portion 512 of the housing 5 and the second housing member 52 via the third gear bearing 343 and the fourth gear bearing 344.

The side plate opening 519 is provided in the side plate portion 512 that partitions the motor accommodation portion 61 and the gear accommodation portion 62. The housing 5 includes the side plate opening 519. The side plate opening 519 penetrates the side plate portion 512 in the Y axis direction and connects the motor accommodation portion 61 and the gear accommodation portion 62. The side plate opening 519 causes in particular the lower portion of the motor accommodation portion 61 and the lower portion of the gear accommodation portion 62 to communicate with each other. The side plate opening 519 allows the oil CL accumulated in the lower portion in the motor accommodation portion 61 to move to the gear accommodation portion 62. The oil CL having moved to the gear accommodation portion 62 can flow into the oil pool P.

Next, the configuration of the second housing member 52 will be described. The second housing member 52 is attached to the gear tubular portion 513 of the first housing member 51 on the +Y direction side. The second housing member 52 has a recessed shape that is open to the side plate portion 512 side. As illustrated in FIG. 1 and the like, the second housing member 52 includes the second gear bearing holding portion 521, the fourth gear bearing holding portion 522, and the second drive shaft passage hole 523. Since these descriptions have been made previously, they are omitted here.

The second housing member 52 includes a saucer portion 524, a gear-side oil passage 525, and a gear-side restricting member 526. In other words, the housing 5 includes the saucer portion 524, the gear-side oil passage 525, and the gear-side restricting member 526.

The saucer portion 524 is disposed radially outward with respect to the fourth gear 321 based on the differential axis J5 and opens in the +Z direction (that is, vertically upward). The oil CL scraped up by the fourth gear 321 is stored in the saucer portion 524. The saucer portion 524 extends in the +Y direction from the side plate portion 512. The end portion of the saucer portion 524 on the +Y direction side is connected to the inner surface of the second housing member 52 facing the −Y direction.

The gear-side oil passage 525 is formed inside the second housing member 52. The gear-side oil passage 525 is the flow path of the oil CL for connecting the end portion of the saucer portion 524 on the +Y direction side and the second gear bearing holding portion 521. Further, one end of the gear-side oil passage 525 is connected to the end portion of the saucer portion 524 on the +Y direction side and is connected to the saucer portion 524. The other end of the gear-side oil passage 525 is connected to the second gear bearing holding portion 521. The oil CL stored in the saucer portion 524 is supplied to the gear-side oil passage 525. As illustrated in FIG. 2, a part of the oil CL supplied to the gear-side oil passage 525 is supplied to the second gear bearing 342. Further, the other part of the oil CL supplied to the gear-side oil passage 525 flows into the hollow portion 3101 from the end portion of the transmission shaft 310 on the +Y direction side and flows in the −Y direction, and flows into the hollow portion 220 of the motor shaft 22.

The gear-side restricting member 526 restricts the amount of the oil CL supplied from the gear-side oil passage 525 to the second gear bearing 342. Due to this restriction, the oil CL supplied from the gear-side oil passage 525 to the hollow portion 220 of the motor shaft 22 through the hollow portion 3101 of the transmission shaft 310 can be secured. The gear-side restricting member 526 includes an annular portion (reference numeral omitted) facing the second gear bearing 342 in the Y axis direction and a tubular portion (reference numeral omitted) which extends in the −Y direction from the radially inner end portion of the annular portion and is inserted into the transmission shaft 310. The annular portion includes a through hole (reference numeral omitted) that penetrates the annular portion in the Y axis direction. The oil CL is supplied to the second gear bearing 342 through the through hole and is supplied into the transmission shaft 310 through the tubular portion.

Next, for example, as illustrated in FIGS. 1 to 3, the housing 5 further includes the motor-side oil passage 55 through which the oil CL flows. A part of the motor-side oil passage 55 is disposed in the first housing member 51, and the rest part is disposed in the third housing member 53. The motor-side oil passage 55 is a flow path through which the oil CL sucked up from the oil pool P of the gear accommodation portion 62 by the pump 4 and cooled by the oil cooler 8 flows toward the motor portion 2.

The motor-side oil passage 55 includes the first oil passage 551, the second oil passage 552, the third oil passage 553, and the fourth oil passage 554. The first oil passage 551, the second oil passage 552, and the third oil passage 553 are formed in the first housing member 51.

As described above, the first oil passage 551 connects the gear accommodation portion 62 and the suction port 41 of the pump 4, and particularly connects the vertically lower portion of the gear accommodation portion 62 and the suction port 41 of the pump 4. In the present embodiment, the first oil passage 551 is formed inside the side plate portion 512.

The oil CL sent from the pump 4 flows through the second oil passage 552 and the third oil passage 553. As described above, the motor-side oil passage 55 includes the second oil passage 552 and the third oil passage 553. The second oil passage 552 connects the discharge port 43 of the pump 4 and the oil cooler 8, and supplies the oil CL discharged from the pump 4 to the oil cooler 8. The third oil passage 553 is connected to the fourth oil passage 554 via a connection flow path 5531 described later. The second oil passage 552 and the third oil passage 553 are disposed in either the plate portion 5141 or the peripheral wall portion 5142.

The fourth oil passage 554 connects the third oil passage 553 and the motor accommodation portion 61. The fourth oil passage 554 is disposed in the third housing member 53. In other words, the fourth oil passage 554 is a through hole formed in the third housing member 53. In this way, the fourth oil passage 554 can be disposed without increasing the number of parts of the drive device 1.

Further, the motor-side oil passage 55 further includes the connection flow path 5531. The connection flow path 5531 connects the second oil passage 552 and the third oil passage 553 to the fourth oil passage 554.

The fourth oil passage 554 includes a first supply passage 555, a second supply passage 556, and a third supply passage 557. The first supply passage 555 is connected to the third oil passage 553 via the connection flow path 5531. The second supply passage 556 connects the first supply passage 555 and an oil supply portion 558. The third supply passage 557 connects the first supply passage 555 and the hollow portion 220 of the motor shaft 22. That is, one end portion of the fourth oil passage 554 is the first supply passage 555, and the other end portion of the fourth oil passage 554 branches into the second supply passage 556 and the third supply passage 557.

In other words, the motor-side oil passage 55 includes the first supply passage 555. The oil CL supplied to the motor portion 2 flows through the first supply passage 555.

Further, the motor-side oil passage 55 further includes the second supply passage 556 and the third supply passage 557. The second supply passage 556 is connected to the oil supply portion 558, and supplies a part of the oil CL flowing through the first supply passage 555 to the outer surface of the stator 25. The third supply passage 557 supplies another part of the oil CL flowing through the first supply passage 555 to the hollow portion 220 of the motor shaft 22. The third supply passage 557 also supplies the oil CL to the first motor bearing 281.

The first supply passage 555, the second supply passage 556, and the third supply passage 557 are disposed in the third housing member 53. In this way, the first supply passage 555, the second supply passage 556, and the third supply passage 557 can be disposed without increasing the number of parts of the drive device 1.

Further, the second supply passage 556 and the third supply passage 557 extend in a direction intersecting the Y axis direction. In this way, it is possible to suppress an increase in the size of the third housing member 53 in the Y axis direction due to the arrangement of the second supply passage 556 and the third supply passage 557.

Preferably, the minimum flow-path cross-sectional area in the third supply passage 557 is smaller than the minimum flow-path cross-sectional area in the second supply passage 556. In this way, the oil CL flowing through the first supply passage 555 flows more easily to the second supply passage 556 than to the third supply passage 557. Therefore, even if the flow pressure of the oil CL flowing through the motor-side oil passage 55 is not increased so much, a sufficient amount of the oil CL flows through the second supply passage 556 so that the oil can be supplied to the outer surface of the stator 25.

Next, the third supply passage 557 is connected to the hollow portion 220 of the motor shaft 22 via the first motor bearing holding portion 531. As described above, the hollow portion 220 of the motor shaft 22 is connected to the rotor through hole 230 of the rotor core 23. For example, the hollow portion 220 of the motor shaft 22 is connected to the rotor through hole 230 via the shaft hole portion 222 and the rotor communication portion 231 (see FIG. 5). That is, the rotor through hole 230 is connected to the third supply passage 557 via the first motor bearing holding portion 531 and the hollow portion 220. Therefore, when the rotor 21 rotates, the oil CL is supplied from the axial end portion of the rotor through hole 230 to the axial end portion of the stator 25. Thus, the axial end portion of the stator 25 can be cooled by the oil CL supplied from the rotor through hole 230, and in particular, the coil end 271 of the stator 25 can be cooled.

The oil CL having cooled the motor portion 2 accumulates in the lower portion of the motor accommodation portion 61 and then flows to the oil pool P in the lower portion of the gear accommodation portion 62 through the side plate opening 519. That is, the oil CL supplied from the second supply passage 556 to the radially outer surface of the stator 25 via the oil supply portion 558 and having cooled the stator 25 accumulates in the lower portion of the motor accommodation portion 61, and then flows to the oil pool P in the lower portion of the gear accommodation portion 62 through the side plate opening 519. The oil CL supplied from the third supply passage 557 to the coil end 271 and the like via the rotor through hole 230 accumulates in the lower portion of the motor accommodation portion 61, and then flows to the oil pool P in the lower portion of the gear accommodation portion 62 through the side plate opening 519.

In the third supply passage 557, a supply restricting member 5571 that restricts the supply amount of the oil CL to the hollow portion 220 is disposed (see FIGS. 1 and 2). In the first motor bearing holding portion 531, the supply restricting member 5571 is disposed at the end portion of the shaft tubular portion 221 on the −Y direction side. The drive device 1 includes the supply restricting member 5511.

In the present embodiment, the minimum flow-path cross-sectional area in the supply restricting member 5571 is smaller than the minimum flow-path cross-sectional area in the second supply passage 556. In this way, the flow pressure and amount of the oil CL to be supplied to the hollow portion 220 of the motor shaft 22 can be adjusted.

Figure 7A:
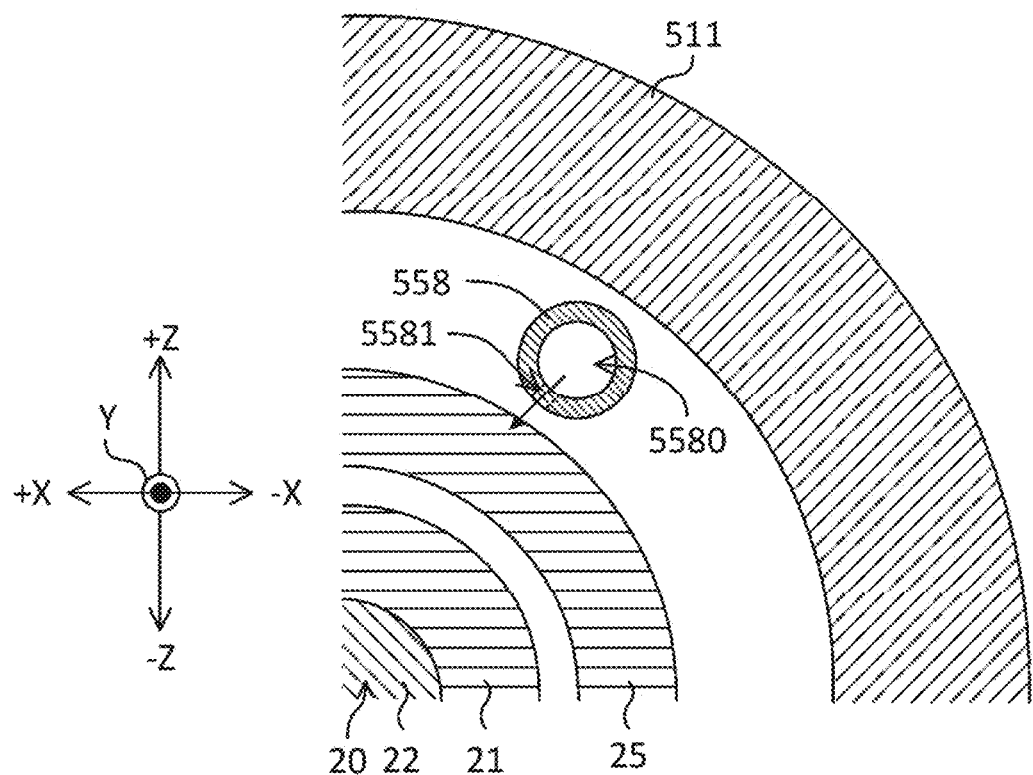
FIG. 7A is a cross-sectional view illustrating a configuration example of an oil supply portion according to the embodiment.
Figure 7B:
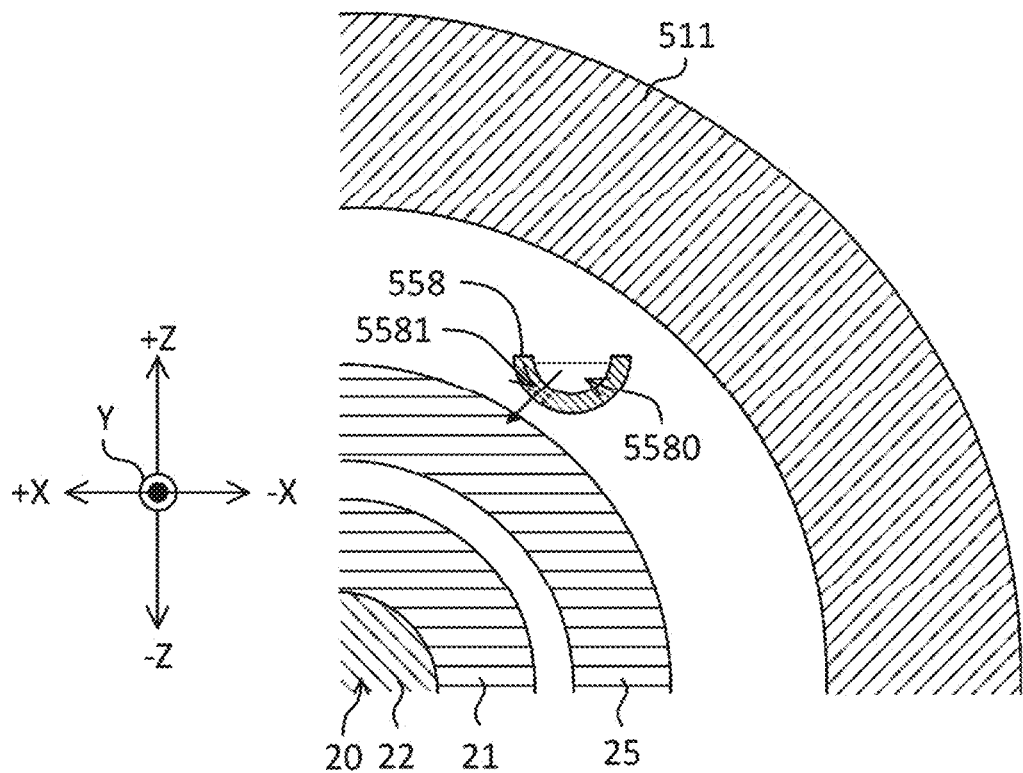
FIG. 7B is a cross-sectional view illustrating a first modification of the configuration of the oil supply portion.
Figure 7C:
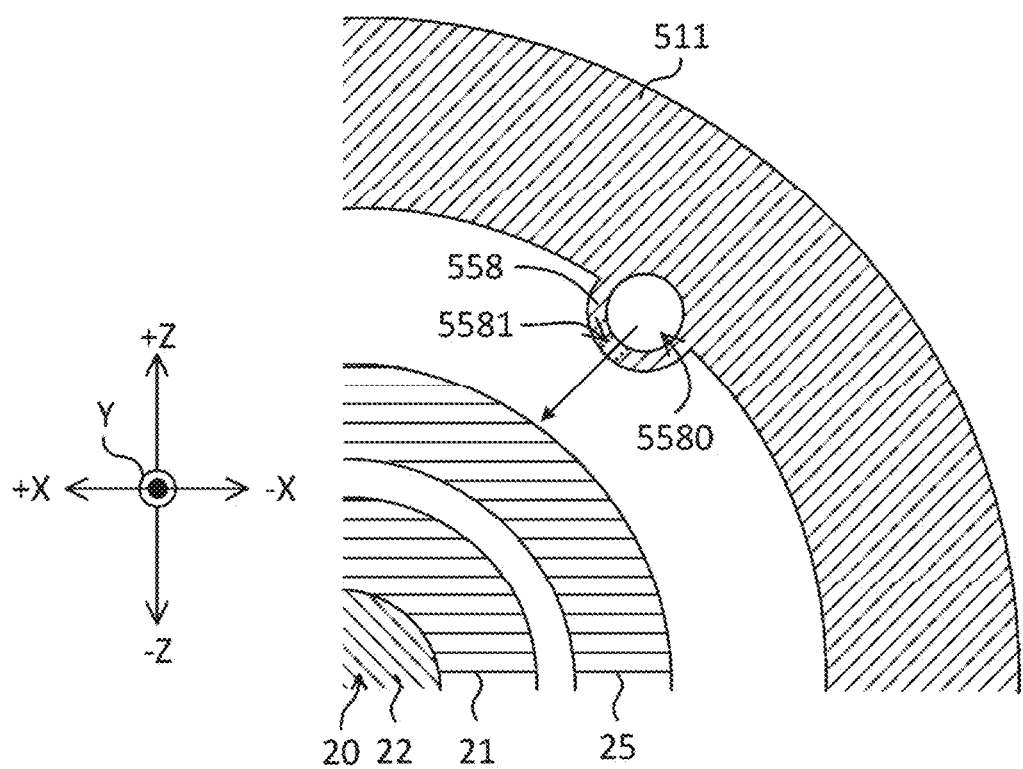
FIG. 7C is a cross-sectional view illustrating a second modification of the configuration of the oil supply portion.
Figure 8:
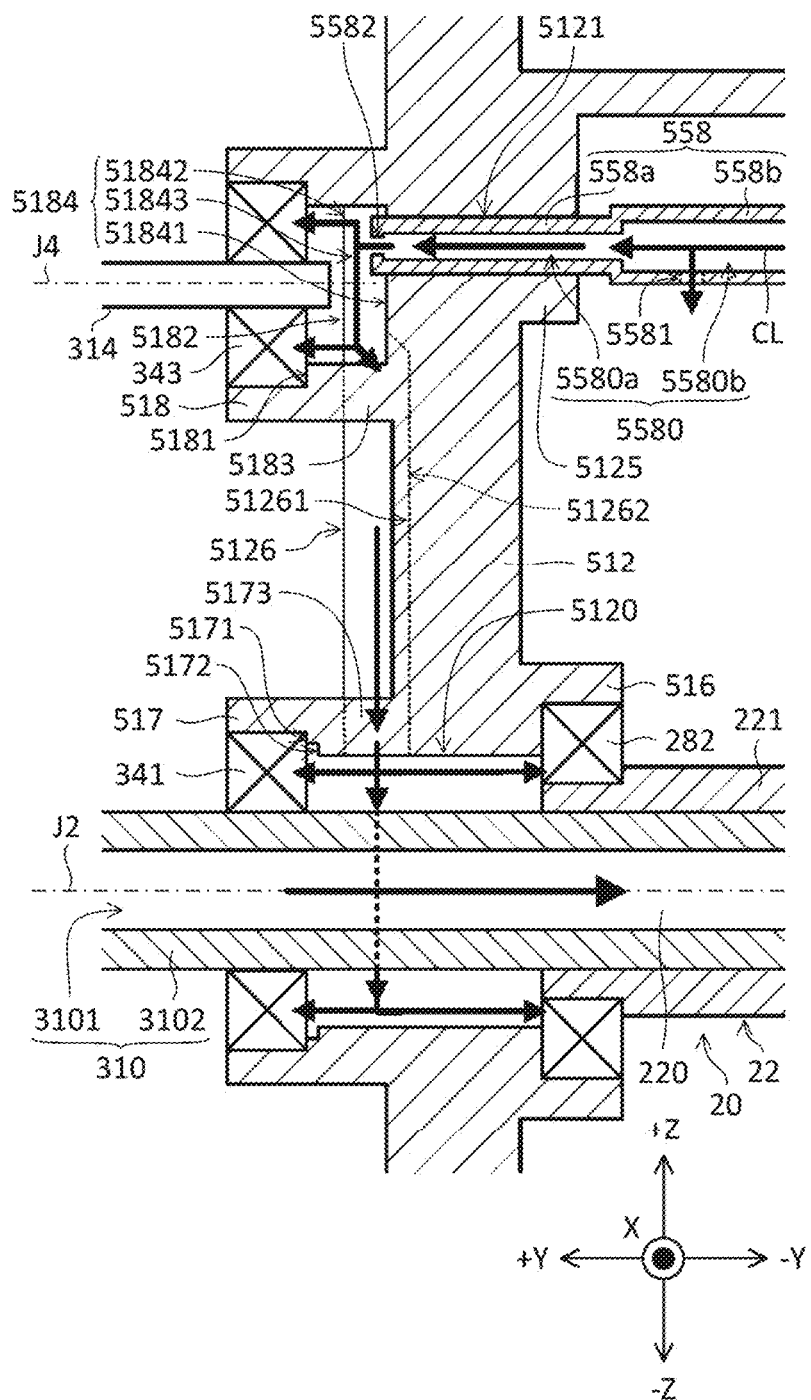
FIG. 8 is a schematic configuration view of an end portion of the oil supply portion on a +Y direction side when viewed from an X axis direction.
Figure 9:
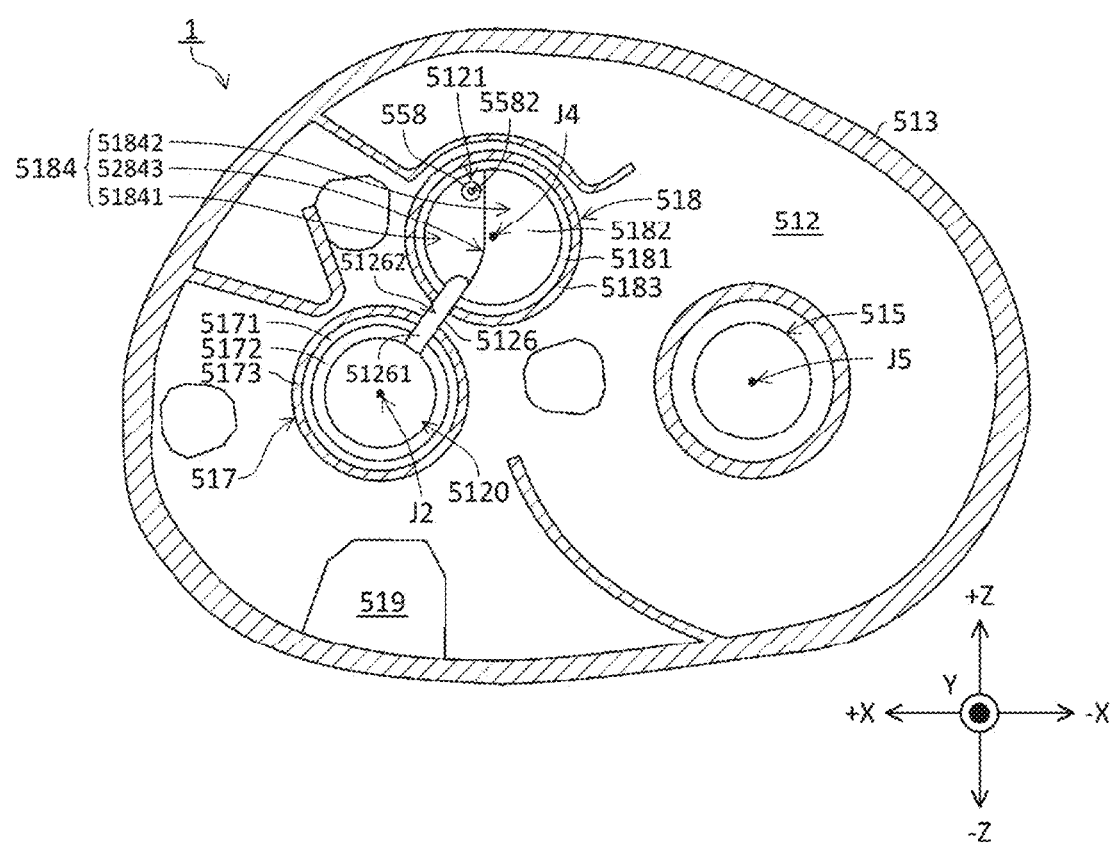
FIG. 9 is a schematic configuration view of the end portion of the oil supply portion on the +Y direction side when viewed from the +Y direction to a -Y direction.

Next, the oil supply portion 558 will be described with reference to FIGS. 7A to 9. The oil supply portion 558 is disposed radially outward of the stator 25 and in the +Z direction with respect to the rotation axis J2. FIG. 7A is a cross-sectional view illustrating a configuration example of the oil supply portion 558 according to the embodiment. FIG. 7B is a cross-sectional view illustrating a first modification of the configuration of the oil supply portion 558. FIG. 7C is a cross-sectional view illustrating a second modification of the configuration of the oil supply portion 558. FIG. 8 is a schematic configuration view of the end portion of the oil supply portion 558 on the +Y direction side when viewed from the X axis direction. FIG. 9 is a schematic configuration view of the end portion of the oil supply portion 558 on the +Y direction side when viewed from the +Y direction to the −Y direction. Further, FIGS. 7A to 7C illustrate a sectional structure in a case where the motor accommodation portion 61 is cut in a virtual plane perpendicular to the Y axis direction.

In the present embodiment, as illustrated in FIG. 7A, the oil supply portion 558 has a pipe shape extending in the Y axis direction, and is accommodated in the motor accommodation portion 61 together with the motor portion 2. In this way, the oil supply portion 558 can be realized with a simple configuration.

Note that the present invention is not limited to the example of the present embodiment, and as illustrated in FIG. 7B, the oil supply portion 558 may be a tray extending in the Y axis direction, and may be opened vertically upward (+Z direction in FIG. 7B). The tray is accommodated in the motor accommodation portion 61 together with the motor portion 2. Even in this case, the oil supply portion 558 can be realized with a simple configuration.

Alternatively, as illustrated in FIG. 7C, the oil supply portion 558 may be a part of the motor tubular portion 511. In this case, an oil flow path 5580 to be described later may be disposed in the motor tubular portion 511. For example, the oil flow path 5580 may be a through hole formed inside the motor tubular portion 511 and extending in the Y axis direction (see FIG. 7C), or may be a groove formed on the inner surface of the motor tubular portion 511 and extending in the Y axis direction. In this way, the space occupied by the oil supply portion 558 in the motor accommodation portion 61 can be excluded or made smaller. Therefore, the oil supply portion 558 can be realized with a simple configuration while saving the space of the motor accommodation portion 61.

Next, the oil supply portion 558 has the oil flow path 5580 through which the oil CL can circulate. The oil flow path 5580 is an example of the "lubricant flow path" of the present invention. The end portion of the oil flow path 5580 on the −Y direction side is connected to the second supply passage 556. On the other hand, in the present embodiment, the end portion of the oil flow path 5580 on the +Y direction side is connected to the third gear bearing holding portion 518, and further connected to the insertion hole 5120 via the third gear bearing holding portion 518. That is, the oil flow path 5580 is also connected to the second motor bearing holding portion 516 and the first gear bearing holding portion 517. Note that the oil flow path 5580 is not limited to the example of the present embodiment, and may be connected only to the third gear bearing holding portion 518 or may be directly connected to the second motor bearing holding portion 516 and the first gear bearing holding portion 517. That is, the oil flow path 5580 may be connected to at least one of the third gear bearing holding portion 518, the second motor bearing holding portion 516, and the first gear bearing holding portion 517.

The oil flow path 5580 through which the oil CL supplied to the stator 25 can circulate is connected to at least one of the third gear bearing holding portion 518 that holds the third gear bearing 343, the first gear bearing holding portion 517 that holds the first gear bearing 341, and the second motor bearing holding portion 516 that holds the second motor bearing 282. Therefore, a part of the oil CL flowing through the oil flow path 5580 can be supplied to the stator 25 to cool the stator 25. Further, another part of the oil CL can cool and lubricate at least one of the third gear bearing 343, the first gear bearing 341, and the second motor bearing 282. Therefore, both cooling of the stator 25, and cooling and lubricating of at least one bearing can be performed by the oil CL flowing through the oil flow path 5580 with a simpler configuration.

Preferably, the oil supply portion 558 includes a first oil supply portion 558a having a first oil flow path 5580a and a second oil supply portion 558b having a second oil flow path 5580b. The oil flow path 5580 includes the first oil flow path 5580a and the second oil flow path 5580b. The first oil flow path 5580a is disposed in the +Y direction with respect to the second oil flow path 5580b and is disposed on the +Y direction side of the oil supply portion 558. The end portion of the second oil flow path 5580b on the −Y direction side is connected to the second supply passage 556. The end portion of the second oil flow path 5580b on the +Y direction side is connected to the −Y direction side of the first oil flow path 5580a. On the other hand, in the present embodiment, the end portion of the first oil flow path 5580a on the +Y direction side is connected to the third gear bearing holding portion 518, and further connected to the insertion hole 5120 via the third gear bearing holding portion 518. The flow-path cross-sectional area of the first oil flow path 5580a may be smaller than the flow-path cross-sectional area of the second oil flow path 5580b. By making the flow-path cross-sectional area of the first oil flow path 5580a closer to the third gear bearing holding portion 518 than the second oil flow path 5580b smaller than the flow-path cross-sectional area of the second oil flow path 5580b, the amount of the oil CL supplied from the oil flow path 5580 to the third gear bearing holding portion 518 can be adjusted. Therefore, the oil CL can be supplied from the oil flow path 5580 to the third gear bearing holding portion 518 while sufficiently securing the amount of the oil CL supplied from the oil flow path 5580 to the stator 25. The above example does not exclude a configuration in which the oil supply portion 558 does not include the first oil supply portion 558a and the second oil supply portion 558b, particularly a configuration in which the oil flow path 5580 does not include the first oil flow path 5580a and the second oil flow path 5580b.

The oil supply portion 558 further includes a dispersion hole 5581. The dispersion hole 5581 is an example of the "first supply hole" of the present invention. The dispersion hole extends from the oil flow path 5580, and opens toward the stator 25. Specifically, the dispersion hole 5581 penetrates the oil supply portion 558 in the radial direction. The dispersion hole 5581 penetrates from the oil flow path 5580 to the outside of the oil supply portion 558, and opens toward the outer surface of the stator 25. This allows the oil CL flowing through the oil flow path 5580 to flow out from the dispersion hole 5581 toward the stator 25. Therefore, the stator 25 can be more reliably cooled by the oil CL.

The oil flow path 5580 and the intermediate axis J4 are disposed on the +Z direction side with respect to the rotation axis J2. The end portion of the oil flow path 5580 on the +Y direction side when viewed from the Y axis direction overlaps with the third gear bearing holding portion 518. Thus, the oil flow path 5580 can be disposed at a position closer to the third gear bearing holding portion 518 that rotatably supports the intermediate shaft 314 along the intermediate axis J4 when viewed in the Y axis direction.

In the present embodiment, the oil supply portion 558 further includes a supply hole 5582. The supply hole 5582 is an example of the "second supply hole" of the present invention. The supply hole 5582 is disposed in the end portion of the oil supply portion 558 on the +Y direction side and penetrates the oil supply portion 558. In the present embodiment, the hole 5121 extends in the Y axis direction, and the end portion of the oil supply portion 558 on the +Y direction side is inserted into the hole 5121 extending in the Y axis direction (see FIG. 1 and the like). The end portion of the oil supply portion 558 on the +Y direction side is disposed in the +Y direction with respect to the end portion of the supply hole 5582 on the +Y direction side. The oil flow path 5580 is connected to the third gear bearing holding portion 518 through the supply hole 5582. Thus, the oil flow path 5580 can be connected to the third gear bearing holding portion 518 with a simple configuration.

However, the present invention is not limited to the above example, and the end portion of the oil supply portion 558 on the +Y direction side may be at the same position (that is, flush) in the Y axis direction as the end portion of the supply hole 5582 on the +Y direction side, or may be disposed in the −Y direction with respect to the end portion of the supply hole 5582 on the +Y direction side.

Figure 10:
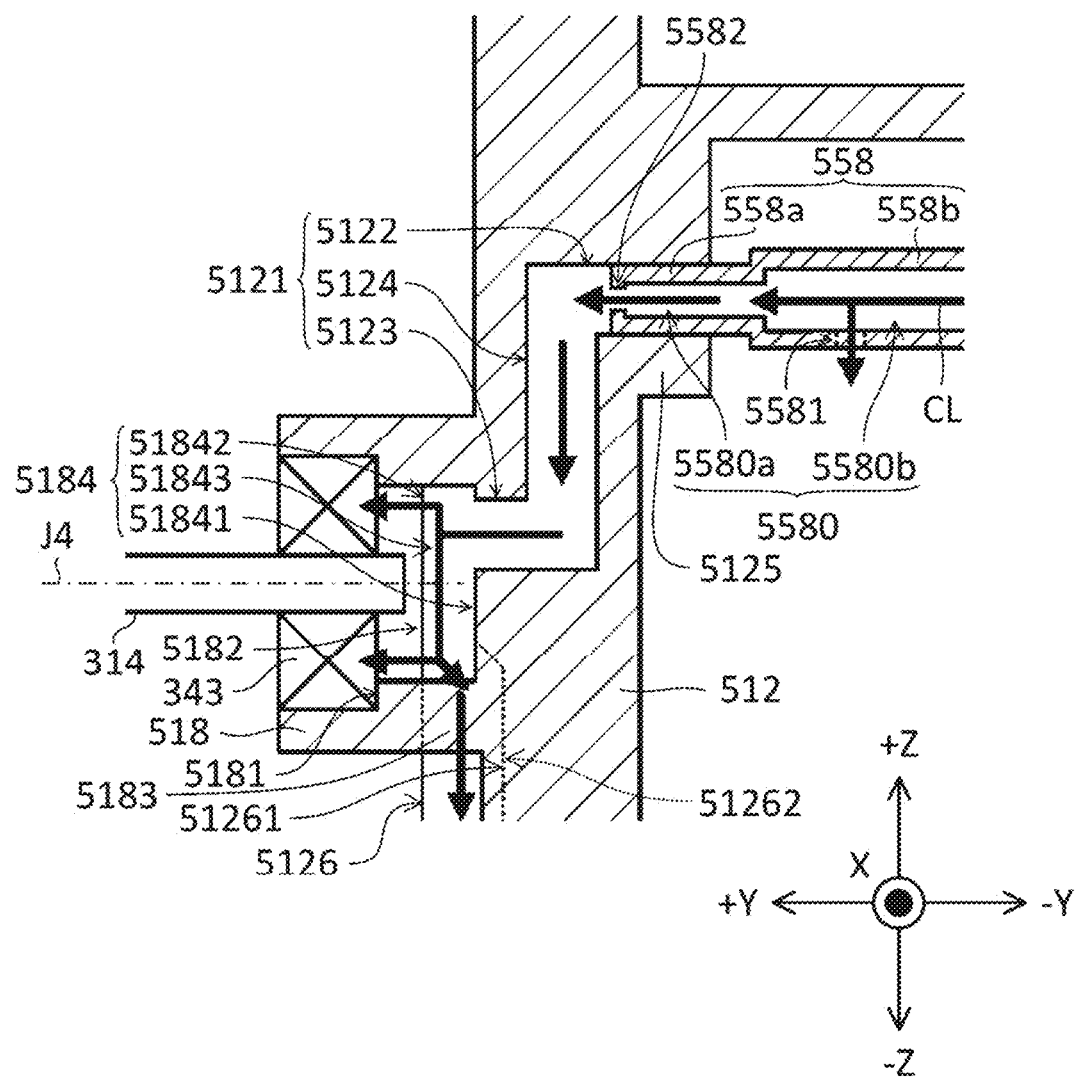
FIG. 10 is a conceptual view illustrating a configuration example of a hole.

The hole 5121 may not be a through hole extending in the Y axis direction. FIG. 10 is a conceptual view illustrating a configuration example of the hole 5121. For example, in FIG. 10, the hole 5121 is disposed inside the side plate portion 512. The hole 5121 includes a first communication passage 5122, a second communication passage 5123, and a third communication passage 5124. The first communication passage 5122 is a space extending in the +Y direction from the end surface of the side plate portion 512 on the −Y direction side, and is connected to the oil flow path 5580. The second communication passage 5123 is a space extending in the −Y direction from the end surface of the side plate portion 512 on the +Y direction side, and is connected to the third gear bearing holding portion 518. The third communication passage 5124 is a space extending in the direction intersecting the Y axis direction, and connects the end portion of the first communication passage 5122 on the +Y direction side and the end portion of the second communication passage 5123 on the −Y direction side. With this configuration, even when the end portion of the oil flow path 5580 on the +Y direction side is separated from the third gear bearing holding portion 518 in a direction intersecting the Y axis direction when viewed in the Y axis direction, both can be connected through the hole 5121. This configuration is particularly effective for a configuration in which the oil flow path 5580 is directly connected to the insertion hole 5120.

Preferably, the +Y direction side of the oil supply portion 558 is fitted into the hole 5121. That is, the +Y direction side of the oil supply portion 558 is fitted to at least the −Y direction side of the hole 5121. For example, the end portion of the oil supply portion 558 on the +Y direction side is inserted into the hole 5121 and protrudes from the hole 5121 in the +Y direction in the case of FIG. 8. Alternatively, the end portion of the oil supply portion 558 on the +Y direction side may be located in the −Y direction with respect to the end portion of the hole 5121 on the +Y direction side. The end portion of the oil supply portion 558 on the +Y direction side is fitted into the first communication passage 5122 in the case of FIG. 10. The radially outer surface of the oil supply portion 558 is in contact with the inner surface of the hole 5121 at the fitting portion between the two. Thus, the −Y direction side of the oil supply portion 558 can be fixed to the side plate portion 512 by fitting of the two. However, this example does not exclude a configuration in which the +Y direction side of the oil supply portion 558 is not fitted to the hole 5121. For example, the oil flow path 5580 may be connected to the hole 5121.

Preferably, the side plate portion 512 further includes a protrusion 5125 extending in the −Y direction. Specifically, the protrusion 5125 extends in the −Y direction in the end surface of the side plate portion 512 on the −Y direction side. The hole 5121 penetrates the protrusion 5125 in the Y axis direction. The protrusion 5125 is connected to the oil supply portion 558. For example, the oil supply portion 558 is inserted and fitted into the hole 5121 in the end portion of the protrusion 5125 on the −Y direction side, or is fixed to the end portion of the protrusion 5125 on the −Y direction side by means such as welding or brazing. Accordingly, the portion of the oil supply portion 558 on the +Y direction side is easily connected to the hole 5121. When the portion of the oil supply portion 558 on the +Y direction side is inserted into or fitted into the hole 5121, the insertion or fitting is facilitated.

Next, the configuration of the third gear bearing holding portion 518 will be described with reference to FIGS. 8 and 9.

The third gear bearing holding portion 518 has an annular outer wall surface 5181 and an inner wall surface 5182. The outer wall surface 5181 and the inner wall surface 5182 are surfaces facing the +Y direction. The end portion of the third gear bearing 343 on the −Y direction side is in contact with the outer wall surface 5181. The inner wall surface 5182 is disposed inside the outer wall surface 5181 when viewed in the Y axis direction and is disposed in the −Y direction with respect to the outer wall surface 5181. At least a part of the end portion of the oil flow path 5580 on the +Y direction side overlaps with the inner wall surface 5182 when viewed from the Y axis direction. Thus, by disposing the inner wall surface 5182 inside the outer wall surface 5181, a gap can be formed between the end portion of the third gear bearing 343 on the −Y direction side and the inner wall surface 5182.

Therefore, with this gap, the oil CL flowing out from the oil flow path 5580 to the third gear bearing holding portion 518 can be supplied to the end portion of the third gear bearing 343 on the −Y direction side. Therefore, the third gear bearing 343 is easily lubricated well.

The third gear bearing holding portion 518 further includes a peripheral wall portion 5183. The peripheral wall portion 5183 has an annular shape surrounding the intermediate axis J4. The outer surface of the third gear bearing 343 is in contact with the peripheral wall portion 5183. One end portion of a passage 5126 is connected to the peripheral wall portion 5183. That is, the passage 5126 penetrates the peripheral wall portion 5183 in the radial direction with respect to the rotation axis J2. Specifically, the side plate portion 512 includes the passage 5126. The passage 5126 is connected to the first gear bearing holding portion 517 and the second motor bearing holding portion 516 from the third gear bearing holding portion 518. Thus, a part of the oil CL supplied to the third gear bearing holding portion 518 can be supplied to the first gear bearing holding portion 517 and the second motor bearing holding portion 516 through the passage 5126. Therefore, the first gear bearing 341 and the second motor bearing 282 can be cooled and lubricated by the supplied oil CL.

The third gear bearing holding portion 518 further includes a guide portion 5184. The guide portion 5184 guides a part of the oil CL supplied to the third gear bearing holding portion 518 to the passage 5126. The guide portion 5184 is a step disposed on the inner wall surface 5182 of the third gear bearing holding portion 518. The guide portion 5184 has a first surface 51841, a second surface 51842, and a first guide surface 51843. Each of the first surface 51841 and the second surface 51842 is a part of the inner wall surface 5182 and faces the +Y direction. The first surface 51841 is disposed in the −Y direction with respect to the second surface 51842, and is disposed in the +X direction with respect to the second surface 51842. The +X direction is an example of "one direction" of the present invention, and is a direction from the intermediate axis J4 toward the rotation axis J2 in a direction (that is, the X axis direction) perpendicular to the Y axis direction and the Z axis direction. The first guide surface 51843 connects the end portion of the first surface 51841 on the second surface 51842 side and the end portion of the second surface 51842 on the first surface 51841 side, and the first guide surface 51843 is connected to the passage 5126. In the present embodiment, the lower end portion in the vertical direction (that is, the end portion on the −Z direction side) of the first guide surface 51843 is connected to the inner surface of the passage 5126. The first guide surface 51843 faces at least one of the +X direction and the +Z direction. By disposing the guide portion 5184 in the inner wall surface 5182, a part of the oil CL supplied to the third gear bearing holding portion 518 is guided to the passage 5126 by the first guide surface 51843, and can be further supplied to the first gear bearing holding portion 517 and the second motor bearing holding portion 516 through the passage 5126. Therefore, the oil CL can be efficiently supplied to the first gear bearing 341 and the second motor bearing 282.

At least a part of the end portion of the hole 5121 on the +Y direction side is disposed in the first surface 51841. In the present embodiment, a part of the end portion of the hole 5121 on the +Y direction side is disposed on the first surface 51841, and the other part is disposed on the outer wall surface 5181. Preferably, the other part of the end portion of the hole 5121 on the +Y direction side is not disposed on the second surface 51842. Preferably, the entire end portion of the hole 5121 on the +Y direction side is disposed in the first surface 51841. Thus, a part of the oil CL supplied to the third gear bearing holding portion 518 is easily guided to the first guide surface 51843.

On the other hand, the other end portion of the passage 5126 is connected to the insertion hole 5120, and is connected to the first gear bearing holding portion 517 in the present embodiment. The first gear bearing holding portion 517 includes a peripheral wall portion 5173. The peripheral wall portion 5173 has an annular shape surrounding the rotation axis J2. The outer surface of the first gear bearing 341 is in contact with the peripheral wall portion 5173. The passage 5126 penetrates the peripheral wall portion 5173 in the radial direction with respect to the rotation axis J2.

The first gear bearing holding portion 517 has an outer annular surface 5171 of an annular shape and an inner annular surface 5172 of an annular shape. Each of the outer annular surface 5171 and the inner annular surface 5172 is a surface facing the +Y direction, and has an annular shape surrounding the rotation axis J2. The end portion of the first gear bearing 341 on the −Y direction side is in contact with the outer annular surface 5171. The inner annular surface 5172 is disposed inside the outer annular surface 5171 when viewed from the Y axis direction, and also disposed in the −Y direction with respect to the outer annular surface 5171. Thus, by disposing the inner annular surface 5172 inside the outer annular surface 5171, a gap can be formed between the end portion of the first gear bearing 341 on the −Y direction side and the inner annular surface 5172. Therefore, with this gap, the oil CL supplied to the first gear bearing holding portion 517 can be supplied to the end portion of the first gear bearing 341 on the −Y direction side. Therefore, the first gear bearing 341 is easily lubricated well.

Preferably, the passage 5126 has a second guide surface 51261. The second guide surface 51261 is a part of the inner surface of the passage 5126. In other words, the inner surface of the passage 5126 includes the second guide surface 51261. The second guide surface 51261 is disposed in the −Y direction with respect to the third gear bearing holding portion 518, and is disposed, for example, in the −Y direction with respect to the first surface 51841 of the inner wall surface 5182. Specifically, the second guide surface 51261 is an inner surface of a groove portion 51262 recessed in the −Y direction. The groove portion 51262 is disposed at least on the inner surface of the passage 5126. In the present embodiment, the one end of the groove portion 51262 is disposed in the inner wall surface 5182 of the third gear bearing holding portion 518. The other end portion of the groove portion 51262 is disposed in at least the outer annular surface 5171 of the first gear bearing holding portion 517. The other end portion of the groove portion 51262 may be further disposed on the inner wall surface 5182. The oil CL can be efficiently guided from the first guide surface 51843 to the inner surface of the passage 5126 by the second guide surface 51261. However, this example does not exclude a configuration in which the passage 5126 does not include the second guide surface 51261.

Preferably, the passage 5126 extends in a direction from one of the rotation axis J2 and the intermediate axis J4 toward the other when viewed in the Y axis direction. For example, the passage 5126 extends linearly in the above direction. Accordingly, since the length of the passage 5126 can be further shortened, the oil CL can be efficiently supplied from the third gear bearing holding portion 518 to the first gear bearing holding portion 517 through the passage 5126.

Figure 11:
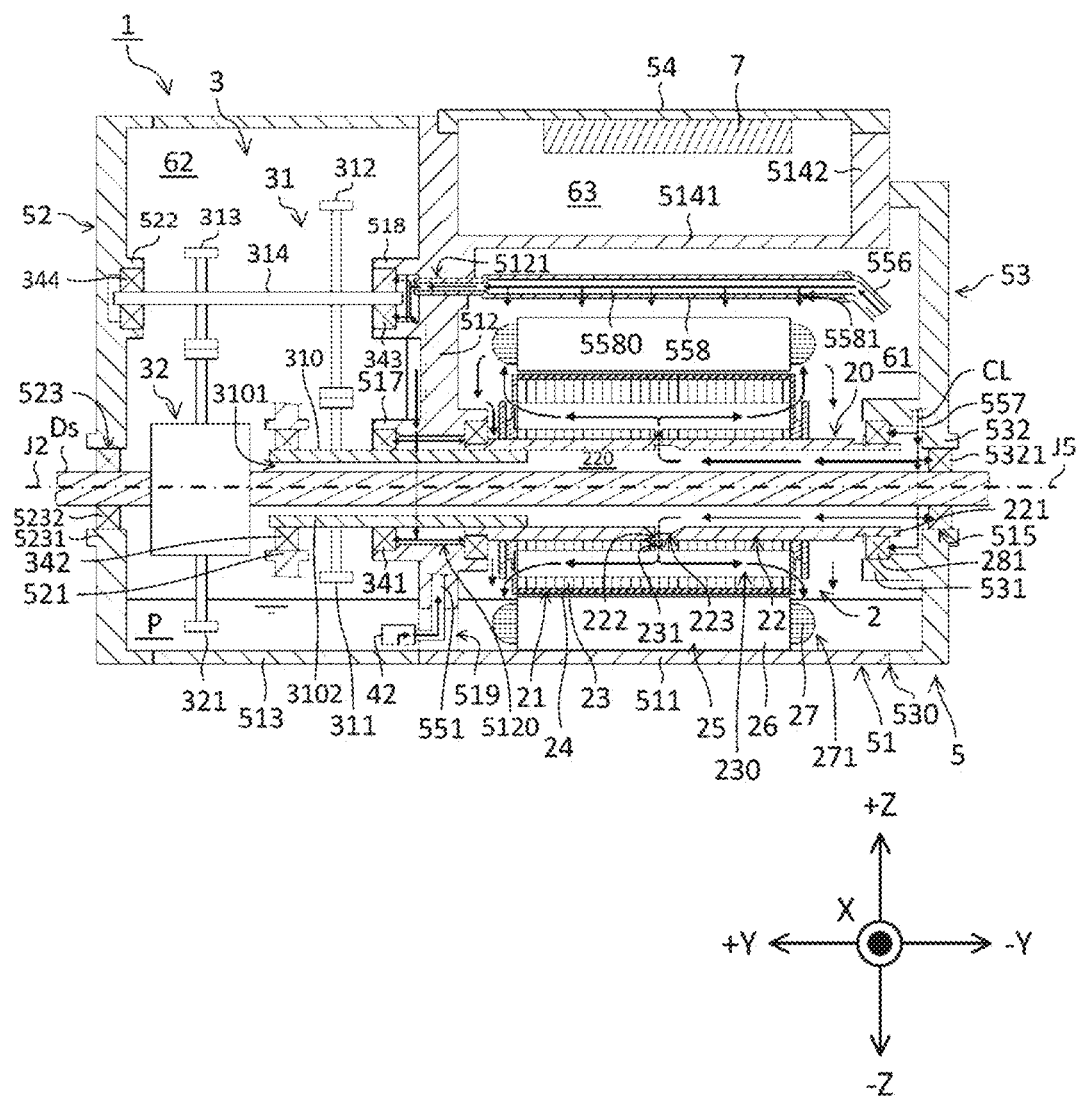
FIG. 11 is a schematic configuration view of a drive device according to a modification when viewed from the X axis direction.

Next, a modification of the embodiment will be described with reference to FIG. 11. FIG. 11 is a schematic configuration view of the drive device 1 according to the modification when viewed from the X axis direction. Note that FIG. 11 is a merely conceptual view, and the layout and dimensions of each portion are not necessarily the same as those of the actual drive device 1. In the following, configurations different from the configuration in the above-mentioned embodiment will be described. Further, the same components as those in the above-described embodiment are designated by the same reference signs, and the description thereof may be omitted.

In the modification, the drive shaft Ds is inserted into the tubular output shaft 20 extending in the Y axis direction and extends along the rotation axis J2. Specifically, a part (that is, a central portion in the Y axis direction) of the drive shaft Ds is disposed inside the output shaft 20. The end portion of the drive shaft Ds on the −Y direction side is disposed in the −Y direction with respect to the output shaft 20. The end portion of the drive shaft Ds on the +Y direction side and the differential device 32 are disposed in the +Y direction with respect to the output shaft 20. The drive shaft Ds is rotatable about the rotation axis J2. That is, the differential axis J5 coincides with the rotation axis J2. The drive device 1 includes the drive shaft Ds. When viewed from the Y axis direction, the drive shaft Ds is disposed concentrically with the output shaft 20.

Specifically, a portion of the drive shaft Ds on the −Y direction side is inserted into the motor shaft 22 and is disposed concentrically with the shaft tubular portion 221 when viewed in the Y axis direction. The first drive shaft passage hole 515 is disposed in the third housing member 53. The third housing member 53 further includes a first output bearing holding portion 532 and a first output bearing 5321. The first output bearing holding portion 532 is arranged in the first drive shaft passage hole 515 and rotatably supports the −Y direction side of the drive shaft Ds via the first output bearing 5321. The first output bearing holding portion 532 is connected to the third supply passage 557. Therefore, the first output bearing 5321 is lubricated and cooled by the oil CL flowing through the third supply passage 557. An oil seal (not illustrated) is disposed on the −Y direction side of the first output bearing holding portion 532.

A portion of the drive shaft Ds on the +Y direction side is inserted into the transmission shaft 310 and is disposed concentrically with the transmission shaft tubular portion 3102 when viewed in the Y axis direction. The differential device 32 is disposed in the +Y direction with respect to the transmission shaft 310. The second housing member 52 further includes a second output bearing holding portion 5231 and a second output bearing 5232. The second output bearing holding portion 5231 is disposed in the second drive shaft passage hole 523, and rotatably supports the +Y direction side of the drive shaft Ds via the second output bearing 5232. An oil seal (not illustrated) is disposed on the +Y direction side of the second output bearing holding portion 5231.

In addition, the second gear bearing holding portion 521 that rotatably holds the end portion on the +Y direction side of the output shaft 20 is disposed on the −Y direction side of the differential device 32 and is supported by the side plate portion 512 or the gear tubular portion 513.

In the modification described above, the drive device 1 further includes the drive shaft Ds. The drive shaft Ds extends along the differential axis J5 extending in the Y axis direction and is rotatable about the differential axis J5. The gear portion 3 further includes the differential device 32. The differential device 32 is attached to the drive shaft Ds, and transmits the torque of the fourth gear 321 to the drive shaft Ds. The output shaft 20 has a tubular shape extending in the Y axis direction. A part of the drive shaft Ds is disposed inside the output shaft 20. The end portion of the drive shaft Ds on the −Y direction side is disposed in the −Y direction with respect to the output shaft 20. The end portion of the drive shaft Ds on the +Y direction side and the differential device 32 are disposed in the +Y direction with respect to the output shaft 20.

Thus, there is no need to secure a space for disposing the drive shaft Ds and the differential device 32 radially outward of the output shaft 20. Therefore, the size of the drive device 1 in a direction perpendicular to the Y axis direction can be made smaller. Therefore, the drive device 1 can be further downsized.

In addition, when viewed from the Y axis direction, the drive shaft Ds is disposed concentrically with the output shaft 20. Thus, a gap can be obtained between the drive shaft Ds and the output shaft 20 in the radial direction with reference to the rotation axis J2. Therefore, this gap can be used as a flow path through which the oil CL flows.

In addition, the differential axis J5 coincides with the rotation axis J2. Since the rotation centers of the drive shaft Ds and the output shaft 20 coincide with each other, the gap between the drive shaft Ds and the output shaft 20 in the radial direction with respect to the rotation axis J2 can be made constant. Therefore, the oil CL can flow into the gap without changing the flow rate and the flow resistance.

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined as appropriate within a range where no inconsistency occurs.

The present invention is useful for a drive motor for a vehicle such as a hybrid vehicle (HV), a plug-in hybrid vehicle (PHV), and an electric vehicle (EV).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
a first shaft configured to extend along a first rotation axis extending in an axial direction and be rotatable about the first rotation axis;
a rotor configured to be supported by the first shaft and rotatable together with the first shaft;
a stator disposed radially outward of the rotor;
a gear portion configured to be connected to one axial end portion of the first shaft;
a lubricant supply portion configured to be disposed radially outward of the stator and supply lubricant to the stator; and
a housing configured to accommodate the rotor, the stator, the lubricant supply portion, and the gear portion,
wherein the gear portion includes a second shaft extending along a second rotation axis extending in the axial direction,
the housing includes:
a motor tubular portion configured to extend in the axial direction;
a gear tubular portion configured to be disposed in one axial direction with respect to the motor tubular portion and extend in the axial direction;
a side plate portion configured to extend in a direction intersecting the axial direction and separate the motor tubular portion and the gear tubular portion;
a motor accommodation portion configured to be surrounded by the motor tubular portion and the side plate portion and accommodate the rotor and the stator; and
a gear accommodation portion configured to be surrounded by the gear tubular portion and the side plate portion and accommodate the gear portion,
the side plate portion includes a first bearing holding portion and a second bearing holding portion,
the first bearing holding portion rotatably supports the first shaft via a first bearing,
the second bearing holding portion rotatably supports the second shaft via a second bearing,
the lubricant supply portion includes a lubricant flow path through which the lubricant is allowed to circulate, and the lubricant flow path is connected to at least one of the first bearing holding portion and the second bearing holding portion.

2. The drive device according to claim 1, wherein
the lubricant supply portion further includes a first supply hole, and
the first supply hole is an opening that extends from the lubricant flow path toward the stator.

3. The drive device according to claim 2, wherein the lubricant supply portion has a pipe shape extending in the axial direction.

4. The drive device according to claim 1, wherein the lubricant flow path is disposed in the motor tubular portion.

5. The drive device according to claim 1, wherein the lubricant supply portion is a tray extending in the axial direction and is opened vertically upward.

6. The drive device according to claim 1, wherein the gear portion further includes:
a first gear configured to be fixed to a radially outer surface of the first shaft;
a second gear and a third gear configured to be fixed to a radially outer surface of the second shaft; and
a fourth gear configured to be rotatable about a third rotation axis extending in the axial direction,
the second gear meshes with the first gear,
the third gear meshes with the fourth gear, and
the second rotation axis is disposed vertically above the first rotation axis and the third rotation axis.

7. The drive device according to claim 1, wherein
the lubricant flow path and the second rotation axis are disposed vertically above the first rotation axis, and
one axial end portion of the lubricant flow path overlaps the second bearing holding portion when viewed from the axial direction.

8. The drive device according to claim 1, wherein
the side plate portion further includes a hole that penetrates the side plate portion in the axial direction and is connected to the second bearing holding portion,
one axial end portion of the lubricant supply portion is inserted into the hole, the lubricant supply portion includes a second supply hole that is disposed in one axial end portion of the lubricant supply portion and penetrates the lubricant supply portion, and the lubricant flow path is connected to the second bearing holding portion through the second supply hole.

9. The drive device according to claim 8, wherein one side of the lubricant supply portion in the axial direction is fitted to the hole.

10. The drive device according to claim 8, wherein the side plate portion further includes a protrusion extending in other axial direction, the hole penetrates the protrusion in the axial direction, and the protrusion is connected to the lubricant supply portion.

11. The drive device according to claim 1, wherein the side plate portion further includes a hole disposed inside the side plate portion, the hole includes a first communication passage, a second communication passage, and a third communication passage, the first communication passage is a space extending in one axial direction from an end surface of other axial direction of the side plate portion, and is connected to the lubricant flow path, the second communication passage is a space extending in other axial direction from an end surface of one axial direction of the side plate portion, and is connected to the second bearing holding portion, and the third communication passage is a space extending in a direction intersecting the axial direction and connects one axial end portion of the first communication passage and other axial end portion of the second communication passage.

12. The drive device according to claim 1, wherein the second bearing holding portion includes an annular outer wall surface and an inner wall surface, the outer wall surface and the inner wall surface are surfaces facing one axial direction, the outer wall surface is in contact with an end portion of the second bearing in other axial direction, the inner wall surface is disposed inside the outer wall surface when viewed from the axial direction, and disposed in other axial direction with respect to the outer wall surface, and at least a part of an end portion of the lubricant flow path on the axial direction overlaps the inner wall surface when viewed from the axial direction.

13. The drive device according to claim 12, wherein the side plate portion further includes a passage connecting from the second bearing holding portion to the first bearing holding portion, the second bearing holding portion further includes a guide portion that guides a part of the lubricant supplied to the second bearing holding portion to the passage, the guide portion includes a first surface, a second surface, and a first guide surface, each of the first surface and the second surface is a part of the inner wall surface, the first surface is disposed on other axial direction with respect to the second surface, and disposed in one direction with respect to the second surface, the one direction is a direction from the second rotation axis to the first rotation axis in a direction perpendicular to the axial direction and a vertical direction, and the first guide surface connects an end portion of the first surface on the second surface side and an end portion of the second surface on the first surface side, and is connected to the passage.

14. The drive device according to claim 13, wherein at least a part of an end portion of the hole in one axial direction is disposed in the first surface.

15. The drive device according to claim 1, wherein the side plate portion further includes a passage connecting from the second bearing holding portion to the first bearing holding portion.

16. The drive device according to claim 15, wherein an inner surface of the passage includes a second guide surface disposed in other axial direction with respect to the second bearing holding portion.

17. The drive device according to claim 15, wherein the passage extends in a direction from one of the first rotation axis and the second rotation axis to other one when viewed from the axial direction.

18. The drive device according to claim 15, wherein the first bearing holding portion includes an annular outer surface of an annular shape, and an annular inner surface of an annular shape, the annular outer surface and the annular inner surface are surfaces facing one axial direction, the annular outer surface is in contact with an end portion of the first bearing in other axial direction, and the annular inner surface is disposed inside the annular outer surface of an annular shape when viewed from the axial direction, and disposed in other axial direction with respect to the annular outer surface.

19. The drive device according to claim 1, wherein the lubricant flow path includes a first lubricant flow path and a second lubricant flow path, the first lubricant flow path is disposed in one axial direction with respect to the second lubricant flow path, and disposed on one side of the lubricant supply portion in the axial direction, and a flow-path cross-sectional area of the first lubricant flow path is smaller than a flow-path cross-sectional area of the second lubricant flow path.

* * * * *